United States Patent

Yang

(10) Patent No.: US 12,504,194 B2
(45) Date of Patent: Dec. 23, 2025

(54) MULTI-SPLIT AIR CONDITIONING SYSTEM AND CONTROL METHOD THEREFOR

(71) Applicants: GD MIDEA HEATING & VENTILATING EQUIPMENT CO., LTD., Foshan (CN); HEFEI MIDEA HEATING & VENTILATING EQUIPMENT CO., LTD., Hefei (CN)

(72) Inventor: Yuantao Yang, Foshan (CN)

(73) Assignees: GO MIDEA HEATING & VENTILATING EQUIPMENT CO., LTD., Foshan (CN); HEFEI MIDEA HEATING & VENTILATING EQUIPMENT CO., LTD., Hefei. (CN)

( * ) Notice: Subject to any disclaimer, the term of this patent is extended or adjusted under 35 U.S.C. 154(b) by 87 days.

(21) Appl. No.: 18/557,957

(22) PCT Filed: Nov. 30, 2021

(86) PCT No.: PCT/CN2021/134215
§ 371 (c)(1),
(2) Date: Oct. 30, 2023

(87) PCT Pub. No.: WO2022/252523
PCT Pub. Date: Dec. 8, 2022

(65) Prior Publication Data
US 2024/0219056 A1 Jul. 4, 2024

(30) Foreign Application Priority Data

Jun. 1, 2021 (CN) .......................... 202110610086.X

(51) Int. Cl.
F24F 11/65 (2018.01)
F24F 11/84 (2018.01)
F24F 110/10 (2018.01)

(52) U.S. Cl.
CPC .............. *F24F 11/65* (2018.01); *F24F 11/84* (2018.01); *F24F 2110/10* (2018.01)

(58) Field of Classification Search
CPC ......... F24F 11/65; F24F 11/84; F24F 2110/10
See application file for complete search history.

(56) References Cited

U.S. PATENT DOCUMENTS

2016/0003499 A1   1/2016   Park et al.

FOREIGN PATENT DOCUMENTS

| CN | 104515322 A | 4/2015 |
|---|---|---|
| CN | 104567074 A | 4/2015 |

(Continued)

OTHER PUBLICATIONS

Search Report received in EP application 21943875.1; mailed Sep. 12, 2024.

(Continued)

*Primary Examiner* — Nael N Babaa
(74) *Attorney, Agent, or Firm* — K&L Gates LLP

(57) ABSTRACT

A multi-split air conditioning system and a control method therefor. The multi-split air conditioning system includes an outdoor unit, at least one indoor unit, and a heat-storage module. The outdoor unit includes a compressor, a first four-way valve, a second four-way valve, an outdoor heat exchanger, and an outdoor throttle; each indoor unit includes an indoor heat exchanger and an indoor throttle; and the heat-storage module includes a heat accumulator and a heat-storage throttle. The control method includes if determined that a shut-down instruction is received or the indoor temperature has reached a set temperature, then obtaining a working mode of a multi-split air conditioning system; and controlling, according to the working mode, a first four-way valve, a second four-way valve, an outdoor throttle, an indoor throttle, and a heat-storage throttle.

20 Claims, 8 Drawing Sheets

(56) References Cited

FOREIGN PATENT DOCUMENTS

| | | |
|---|---|---|
| CN | 104634008 A | 5/2015 |
| CN | 104879843 A | 9/2015 |
| CN | 107110570 A | 8/2017 |
| CN | 104567073 B | 10/2017 |
| CN | 112815414 A | 5/2021 |
| EP | 2863158 B1 | 6/2017 |
| JP | 2002221371 A | 8/2002 |
| JP | 2004279005 A | 10/2004 |

OTHER PUBLICATIONS

International Search Report received in PCT/CN2021/134215; mailed Feb. 24, 2022.
First Office Action received in CN application No. 202110610086.X; mailed Jul. 29, 2023.

MULTI-SPLIT AIR CONDITIONING SYSTEM AND CONTROL METHOD THEREFOR

CROSS-REFERENCES TO RELATED APPLICATIONS

The present disclosure is a national phase application of International Application No. PCT/CN2021/134215, filed on Nov. 30, 2021, which claims priority to Chinese Patent Application Serial No. 202110610086.X, filed with the National Intellectual Property Administration of PRC on Jun. 1, 2021, the entireties of which are herein incorporated by reference.

FIELD

The present disclosure relates to the field of an air conditioner technology, particularly relates to a control method for a multi-split system and a multi-split system.

BACKGROUND

With the ongoing development of a multi-split system technology, it has been increasing of a demand on comfortability and intelligence for a user. If the user turns an air conditioner off by accident while the multi-split system is operating, it will cause a compressor to shut down immediately. Because of a time interval set for restarting the multi-split system after shut-down, e.g., usually 5 min or more, especially in the case of accidental shut-down of the multi-split system during heating for a low temperature, the multi-split system will responds at a low speed, thus adversely affecting the user comfortability. On the other hand, it is becoming increasingly common for a compressor to shut down when an indoor temperature reaches to a set temperature with a low load at an indoor side as a result of an increasingly good insulation effect of buildings, resulting in lack of oil in the compressor for frequent shut-down in the case of the indoor temperature reaching to the set temperature, thus adversely influencing system reliability.

Therefore, how to solve the above problems to improve the user comfortability and the system reliability is currently an urgent problem to be solved.

SUMMARY

The present disclosure aims to solve at least one of the problems in the related art.

Embodiments of the present disclosure are to propose a control method for a multi-split system with a heat-storage module included, allows for standby operation with the heat-storage module under accidental shut-down by a user, thus facilitating a rapid response after the user corrects the fault, thereby improving the user comfortability; or allows for continuous operation with the heat-storage module when an indoor temperature reaches to a set temperature, thus decreasing a frequency of powering on/shutting down of a compressor, thereby improving the system reliability.

Embodiments of the present disclosure are to provide a non-temporary computer-readable storage medium.

Embodiments of the present disclosure are to provide a multi-split system.

Embodiments of the present disclosure provide a control method for a multi-split system, and the multi-split system includes an outdoor unit, at least one indoor unit, and a heat-storage module, and the outdoor unit includes a compressor, a first four-way valve, a second four-way valve, an outdoor heat exchanger, and an outdoor throttle;

and each indoor unit includes an indoor heat exchanger and an indoor throttle;

and the heat-storage module includes a heat-storage element and a heat-storage throttle, and the first four-way valve is provided with a first port connected to an exhaust port of the compressor, a second port connected to an end of each indoor heat exchanger, and a third port connected to an air-return port of the compressor;

and the second four-way valve is provided with a first port connected to the exhaust port of the compressor, a second port connected to an end of the outdoor heat exchanger, with another end of the outdoor heat exchanger connected to an end of each indoor throttle via the outdoor throttle; and another end of each indoor throttle connected to another end of each indoor heat exchanger, a third port connected to the air-return port of the compressor, and a fourth port connected to an end of the heat-storage element, with another end of the heat-storage element connected to the end of each indoor throttle via the heat-storage throttle, and the control method includes:

acquiring an operation mode of the multi-split system, in response to determining that a shut-down instruction is received or an indoor temperature reaches to a set temperature; and controlling the first four-way valve, the second four-way valve, the outdoor throttle, the indoor throttle and the heat-storage throttle in accordance with the operation mode.

According to embodiments of the present disclosure, the control method for the multi-split system, acquires the operation mode of the multi-split system, in response to determining that the shut-down instruction is received or the indoor temperature reaches to the set temperature; and controls the first four-way valve, the second four-way valve, the outdoor throttle, the indoor throttle and the heat-storage throttle in the heat-storage module in accordance with the operation mode. Accordingly, the control method, with the heat-storage module included, allows for the standby operation with the heat-storage module under accidental shut-down by the user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

In addition, the control method for the multi-split system according to the above embodiment of the present disclosure may further include the following additional features.

According to an embodiment of the present disclosure, based on that the shut-down instruction is received during operation in a normal refrigerating mode of the multi-split system, controlling the first four-way valve, the second four-way valve, the outdoor throttle, the indoor throttle and the heat-storage throttle includes:

controlling the first four-way valve to power on, the second four-way valve to power off, the outdoor throttle to open, the indoor throttle to close, and the heat-storage throttle to open, in response to determining that the shut-down instruction is received, to enable the multi-split system to operate in a first standby operation mode;

controlling the first four-way valve to power on, the second four-way valve to power off, the outdoor throttle to open, the indoor throttle to open, and the heat-storage throttle to close, in response to determining that a turn-on instruction is received within a first preset time period, to enable the multi-split system to continue to operate in the normal refrigerating mode; or controlling the compressor to shut down, in response to determining that the turn-on instruction is not received within the first preset time period, or that the multi-split system is of an air-return superheat lower than a first preset air-return superheat.

According to an embodiment of the present disclosure, based on that the shut-down instruction is received during operation in a normal heating mode of the multi-split system, controlling the first four-way valve, the second four-way valve, the outdoor throttle, the indoor throttle and the heat-storage throttle includes:

controlling the first four-way valve to power off, the second four-way valve to power on, the outdoor throttle to open, the indoor throttle to open a first preset opening degree, and the heat-storage throttle to open, in response to determining that the shut-down instruction is received, to enable the multi-split system to operate in a second standby operation mode;

controlling the first four-way valve to power off, the second four-way valve to power on, the outdoor throttle to open, the indoor throttle to open, and the heat-storage throttle to close, in response to determining that a turn-on instruction is received within a second preset time period, to enable the multi-split system to continue to operate in the normal heating mode; or controlling the compressor to shut down, in response to determining that the turn-on instruction is not received within the second preset time period, or that the multi-split system is of an exhaust-side pressure greater than or equal to a first preset exhaust-side pressure.

According to an embodiment of the present disclosure, based on that the indoor temperature reaches to the set temperature during operation in a normal refrigerating mode of the multi-split system, controlling the first four-way valve, the second four-way valve, the outdoor throttle, the indoor throttle and the heat-storage throttle includes:

acquiring a first time interval between a current time when the indoor temperature reaches to the set temperature and a previous time when the indoor temperature reached to the set temperature, in response to determining that the indoor temperature reaches to the set temperature;

controlling the first four-way valve to power on, the second four-way valve to power off, the outdoor throttle to open, the indoor throttle to close, and the heat-storage throttle to open, in response to determining that the first time interval is less than a first preset time interval, to enable the multi-split system to operate in a first standby operation mode; or controlling the compressor to shut down, in response to determining that the first time interval is greater than or equal to the first preset time interval.

According to an embodiment of the present disclosure, after the multi-split system is operating in the first standby operation mode, the control method further includes:

acquiring an air-return superheat of the multi-split system;

controlling the compressor to shut down, in response to determining that the air-return superheat of the multi-split system is lower than a second preset air-return superheat; or continuing to acquire the first time interval between the current time when the indoor temperature reaches to the set temperature and the previous time when the indoor temperature reached to the set temperature, in response to determining that the air-return superheat of the multi-split system is greater than or equal to the second preset air-return superheat.

According to an embodiment of the present disclosure, after determining that the indoor temperature does not reach to the set temperature, the control method further includes:

acquiring a first accumulating time period during which the multi-split system is operating in the normal refrigerating mode;

controlling the first four-way valve to power on, the second four-way valve to power on, the outdoor throttle to close, the indoor throttle to open, and the heat-storage throttle to open, in response to determining that the first accumulating time period is greater than or equal to a first preset accumulating time period, thereby refrigerating with a cooling quantity accumulated in the heat-storage element; or controlling the first four-way valve to power on, the second four-way valve to power off, the outdoor throttle to open, the indoor throttle to open, and the heat-storage throttle to close, in response to determining that the first accumulating time period is less than the first preset accumulating time period, to enable the multi-split system to continue to operate in the normal refrigerating mode.

According to an embodiment of the present disclosure, after refrigerating with the cooling quantity accumulated in the heat-storage element, the control method further includes:

acquiring an exhaust-side pressure of the multi-split system;

controlling the first four-way valve to power on, the second four-way valve to power off, the outdoor throttle to open, the indoor throttle to open, and the heat-storage throttle to close, in response to determining that the exhaust-side pressure of the multi-split system is greater than or equal to a second preset exhaust-side pressure, to enable the multi-split system to continue to operate in the normal refrigerating mode; or continuing to control the first four-way valve to power on, the second four-way valve to power on, the outdoor throttle to close, the indoor throttle to open, and the heat-storage throttle to open, in response to determining that the exhaust-side pressure of the multi-split system is lower than the second preset exhaust-side pressure, thereby refrigerating with the cooling quantity accumulated in the heat-storage element.

According to an embodiment of the present disclosure, based on that the indoor temperature reaches to the set temperature during operation in the normal heating mode of the multi-split system, controlling the first four-way valve, the second four-way valve, the outdoor throttle, the indoor throttle and the heat-storage throttle includes:

acquiring a second time interval between a current time when the indoor temperature reaches to the set temperature and a previous time when the indoor temperature reached to the set temperature, in response to determining that the indoor temperature reaches to the set temperature;

controlling the first four-way valve to power off, the second four-way valve to power on, the outdoor throttle to open, the indoor throttle to open a first preset opening degree, and the heat-storage throttle to open, in response to determining that the second time interval is less than a second preset time interval, to enable the multi-split system to operate in a second standby operation mode; or controlling the compressor to shut down, in response to determining that the second time interval is greater than or equal to the second preset time interval.

According to an embodiment of the present disclosure, after the multi-split system is operating in the second standby operation mode, the control method further includes:

acquiring an exhaust-side pressure of the multi-split system;

controlling the compressor to shut down, in response to determining that the exhaust-side pressure of the multi-split system is greater than or equal to a third preset exhaust-side pressure; or continuing to acquire the second time interval between the current time when the indoor temperature reaches to the set temperature and the previous time when the indoor temperature reached to the set temperature, in response to determining that the exhaust-side pressure of the multi-split system is lower than the third preset exhaust-side pressure.

According to an embodiment of the present disclosure, after determining that the indoor temperature does not reach to the set temperature, the control method further includes:

acquiring a second accumulating time period during which the multi-split system is operated in the normal heating mode;

controlling the first four-way valve to power off, the second four-way valve to power off, the outdoor throttle to close, the indoor throttle to open, and the heat-storage throttle to open, in response to determining that the second accumulating time period is greater than or equal to a second preset accumulating time period, thereby heating with a heat quantity accumulated in the heat-storage element; or controlling the first four-way valve to power off, the second four-way valve to power on, the outdoor throttle to open, the indoor throttle to open, and the heat-storage throttle to close, in response to determining that the second accumulating time period is less than the second preset accumulating time period, to enable the multi-split system to continue to operate in the normal heating mode.

According to an embodiment of the present disclosure, after heating with the heat quantity accumulated in the heat-storage element, the control method further includes:

acquiring an air-return superheat of the multi-split system;

controlling the first four-way valve to power off, the second four-way valve to power on, the outdoor throttle to open, the indoor throttle to open, and the heat-storage throttle to close, in response to determining that the air-return superheat of the multi-split system is lower than a third preset air-return superheat, to enable the multi-split system to continue to operate in the normal heating mode; or continuing to control the first four-way valve to power off, the second four-way valve to power off, the outdoor throttle to close, the indoor throttle to open, and the heat-storage throttle to open, in response to determining that the air-return superheat of the multi-split system is greater than or equal to the third preset air-return superheat, thereby heating with the heat quantity accumulated in the heat-storage element.

Embodiments of the present disclosure provide a non-temporary computer-readable storage medium having stored therein an instruction that, when executed by a multi-split system, implements the control method for the multi-split system according to any embodiments described above.

According to embodiments of the present disclosure, the non-temporary computer-readable storage medium, by means of performing the control method for the multi-split system as described above, allows for the standby operation with the heat-storage module under accidental shut-down by the user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

Embodiments of the present disclosure provide a multi-split system, including:

at least one indoor unit, each indoor unit including an indoor heat exchanger and an indoor throttle;

a heat-storage module, including a heat-storage element and a heat-storage throttle;

an outdoor unit, including a compressor, a first four-way valve, a second four-way valve, an outdoor heat exchanger, and an outdoor throttle, and the first four-way valve is provided with a first port connected to an exhaust port of the compressor, a second port connected to an end of each indoor heat exchanger, and a third port connected to an air-return port of the compressor;

and the second four-way valve is provided with a first port connected to the exhaust port of the compressor, a second port connected to an end of the outdoor heat exchanger, with another end of the outdoor heat exchanger connected to an end of each indoor throttle via the outdoor throttle; and another end of each indoor throttle connected to another end of each indoor heat exchanger, a third port connected to the air-return port of the compressor, and a fourth port connected to an end of the heat-storage element, with another end of the heat-storage element connected to the end of each indoor throttle via the heat-storage throttle; and a controller, configured to acquire an operation mode of the multi-split system, in response to determining that a shut-down instruction is received or an indoor temperature reaches to a set temperature; and control the first four-way valve, the second four-way valve, the outdoor throttle, the indoor throttle and the heat-storage throttle in accordance with the operation mode.

According to embodiments of the present disclosure, the multi-split system is composed of at least one indoor unit, the outdoor unit and the heat-storage module, where each indoor unit includes an indoor heat exchanger and an indoor throttle; the heat-storage module includes a heat-storage element and a heat-storage throttle; the outdoor unit includes a compressor, a first four-way valve, a second four-way valve, an outdoor heat exchanger, and an outdoor throttle; and the first four-way valve is provided with a first port connected to an exhaust port of the compressor, a second port connected to an end of each indoor heat exchanger, and a third port connected to an air-return port of the compressor; and the second four-way valve is provided with a first port connected to the exhaust port of the compressor, a second port connected to an end of the outdoor heat exchanger, with another end of the outdoor heat exchanger connected to an end of each indoor throttle via the outdoor throttle; and another end of each indoor throttle connected to another end of each indoor heat exchanger, a third port connected to the air-return port of the compressor, and a fourth port connected to an end of the heat-storage element, with another end of the heat-storage element connected to the end of each indoor throttle via the heat-storage throttle; and a controller, configured to: acquire the operation mode of the multi-split system, in response to determining that the shut-down instruction is received or the indoor temperature reaches to the set temperature; and control the first four-way valve, the second four-way valve, the outdoor throttle, the indoor throttle and the heat-storage throttle in accordance with the operation mode. Accordingly, the multi-split system, with the heat-storage module included, allows for the standby operation with the heat-storage module under accidental shut-down by the user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

In addition, the multi-split system according to the above embodiment of the present disclosure may further include the following additional features.

According to an embodiment of the present disclosure, based on that the shut-down instruction is received during operation in a normal refrigerating mode of the multi-split system, the controller is configured to
 control the first four-way valve to power on, the second four-way valve to power off, the outdoor throttle to open, the indoor throttle to close, and the heat-storage throttle to open, in response to determining that the shut-down instruction is received, to enable the multi-split system to operate in a first standby operation mode;
 control the first four-way valve to power on, the second four-way valve to power off, the outdoor throttle to open, the indoor throttle to open, and the heat-storage throttle to close, in response to determining that a turn-on instruction is received within a first preset time period, to enable the multi-split system to continue to operate in the normal refrigerating mode; or
 control the compressor to shut down, in response to determining that the turn-on instruction is not received within the first preset time period, or that the multi-split system is of an air-return superheat lower than a first preset air-return superheat.

According to an embodiment of the present disclosure, based on that the shut-down instruction is received during operation in a normal heating mode of the multi-split system, the controller is configured to:
 control the first four-way valve to power off, the second four-way valve to power on, the outdoor throttle to open, the indoor throttle to open a first preset opening degree, and the heat-storage throttle to open, in response to determine that the shut-down instruction is received, to enable the multi-split system to operate in a second standby operation mode;
 control the first four-way valve to power off, the second four-way valve to power on, the outdoor throttle to open, the indoor throttle to open, and the heat-storage throttle to close, in response to determining that a turn-on instruction is received within a second preset time period, to enable the multi-split system to continue to operate in the normal heating mode; or
 control the compressor to shut down, in response to determining that the turn-on instruction is not received within the second preset time period, or that the multi-split system is of an exhaust-side pressure greater than or equal to a first preset exhaust-side pressure.

According to an embodiment of the present disclosure, based on that the indoor temperature reaches to the set temperature during operation in a normal refrigerating mode of the multi-split system, the controller is configured to:
 acquire a first time interval between a current time when the indoor temperature reaches to the set temperature and a previous time when the indoor temperature reached to the set temperature, in response to determining that the indoor temperature reaches to the set temperature;
 control the first four-way valve to power on, the second four-way valve to power off, the outdoor throttle to open, the indoor throttle to close, and the heat-storage throttle to open, in response to determining that the first time interval is less than a first preset time interval, to enable the multi-split system to operate in a first standby operation mode; or
 control the compressor to shut down, in response to determining that the first time interval is greater than or equal to the first preset time interval.

According to an embodiment of the present disclosure, after the multi-split system is operating in the first standby operation mode, the controller is further configured to:
 acquire an air-return superheat of the multi-split system;
 control the compressor to shut down, in response to determining that the air-return superheat of the multi-split system is lower than a second preset air-return superheat; or
 continue to acquire the first time interval between the current time when the indoor temperature reaches to the set temperature and the previous time when the indoor temperature reached to the set temperature, in response to determining that the air-return superheat of the multi-split system is greater than or equal to the second preset air-return superheat.

According to an embodiment of the present disclosure, after determining that the indoor temperature does not reach to the set temperature, the controller is further configured to:
 acquire a first accumulating time period during which the multi-split system is operating in the normal refrigerating mode;
 control the first four-way valve to power on, the second four-way valve to power on, the outdoor throttle to close, the indoor throttle to open, and the heat-storage throttle to open, in response to determining that the first accumulating time period is greater than or equal to a first preset accumulating time period, thereby refrigerating with a cooling quantity accumulated in the heat-storage element; or
 control the first four-way valve to power on, the second four-way valve to power off, the outdoor throttle to open, the indoor throttle to open, and the heat-storage throttle to close, in response to determining that the first accumulating time period is less than the first preset accumulating time period, to enable the multi-split system to continue to operate in the normal refrigerating mode.

According to an embodiment of the present disclosure, after refrigerating with the cooling quantity accumulated in the heat-storage element, the controller is further configured to:
acquire an exhaust-side pressure of the multi-split system;
control the first four-way valve to power on, the second four-way valve to power off, the outdoor throttle to open, the indoor throttle to open, and the heat-storage throttle to close, in response to determining that the exhaust-side pressure of the multi-split system is greater than or equal to a second preset exhaust-side pressure, to enable the multi-split system to continue to operate in the normal refrigerating mode; or
continue to control the first four-way valve to power on, the second four-way valve to power on, the outdoor throttle to close, the indoor throttle to open, and the heat-storage throttle to open, in response to determining that the exhaust-side pressure of the multi-split system is lower than the second preset exhaust-side pressure, thereby refrigerating with the cooling quantity accumulated in the heat-storage element.

According to an embodiment of the present disclosure, based on that the indoor temperature reaches to the set temperature during operation in the normal heating mode of the multi-split system, the controller is configured to:
acquire a second time interval between a current time when the indoor temperature reaches to the set temperature and a previous time when the indoor temperature reached to the set temperature, in response to determining that the indoor temperature reaches to the set temperature;
control the first four-way valve to power off, the second four-way valve to power on, the outdoor throttle to open, the indoor throttle to open a first preset opening degree, and the heat-storage throttle to open, in response to determining that the second time interval is less than a second preset time interval, to enable the multi-split system to operate in a second standby operation mode; or
control the compressor to shut down, in response to determining that the second time interval is greater than or equal to the second preset time interval.

According to an embodiment of the present disclosure, after the multi-split system is operating in the second standby operation mode, the controller is further configured to:
acquire an exhaust-side pressure of the multi-split system;
control the compressor to shut down, in response to determining that the exhaust-side pressure of the multi-split system is greater than or equal to a third preset exhaust-side pressure; or
continue to acquire the second time interval between the current time when the indoor temperature reaches to the set temperature and the previous time when the indoor temperature reached to the set temperature, in response to determining that the exhaust-side pressure of the multi-split system is lower than the third preset exhaust-side pressure.

According to an embodiment of the present disclosure, after determining that the indoor temperature does not reach to the set temperature, the controller is further configured to:

acquire a second accumulating time period during which the multi-split system is operated in the normal heating mode;
control the first four-way valve to power off, the second four-way valve to power off, the outdoor throttle to close, the indoor throttle to open, and the heat-storage throttle to open, in response to determining that the second accumulating time period is greater than or equal to a second preset accumulating time period, thereby heating with a heat quantity accumulated in the heat-storage element; or
control the first four-way valve to power off, the second four-way valve to power on, the outdoor throttle to open, the indoor throttle to open, and the heat-storage throttle to close, in response to determining that the second accumulating time period is less than the second preset accumulating time period, to enable the multi-split system to continue to operate in the normal heating mode.

According to an embodiment of the present disclosure, after heating with the heat quantity accumulated in the heat-storage element, the controller is further configured to:
acquire an air-return superheat of the multi-split system;
control the first four-way valve to power off, the second four-way valve to power on, the outdoor throttle to open, the indoor throttle to open, and the heat-storage throttle to close, in response to determining that the air-return superheat of the multi-split system is lower than a third preset air-return superheat, to enable the multi-split system to continue to operate in the normal heating mode; or
continue to control the first four-way valve to power off, the second four-way valve to power off, the outdoor throttle to close, the indoor throttle to open, and the heat-storage throttle to open, in response to determining that the air-return superheat of the multi-split system is greater than or equal to the third preset air-return superheat, thereby heating with the heat quantity accumulated in the heat-storage element.

The embodiments of the present disclosure will be partially provided in the following description, which will become apparent from the following description or learned through the practice of the present disclosure.

BRIEF DESCRIPTION OF THE DRAWINGS

The above embodiments of the present disclosure will become understandable with the following description for embodiments in combination with the drawings, in which.

DETAILED DESCRIPTION OF THE DISCLOSURE

Figure 1:
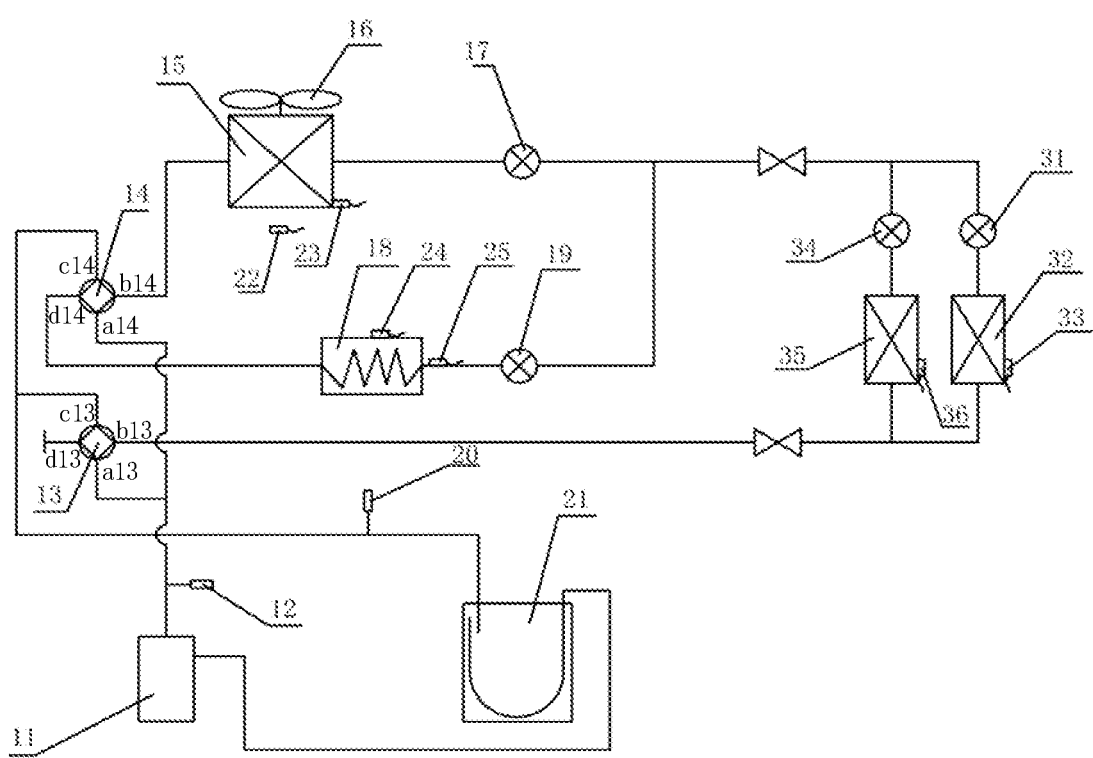
FIG. 1 is a schematic view showing a multi-split system according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A control method for a multi-split system, and a multi-split system proposed in embodiments of the present disclosure are described below in combination with the drawings In embodiments of the present disclosure, the multi-split system includes: an outdoor unit, at least one indoor unit, a heat-storage module, and a controller, where the outdoor unit includes a compressor, a first four-way valve, a second four-way valve, an outdoor heat exchanger, an outdoor throttle; each indoor unit includes an indoor heat exchanger and an indoor throttle; the heat-storage module includes a heat-storage element and a heat-storage throttle. In specific, the first four-way valve is provided with a first port connected to an exhaust port of the compressor, a second port connected to an end of each indoor heat exchanger, and a third port connected to an air-return port of the compressor; and the second four-way valve is provided with a first port connected to the exhaust port of the compressor, a second port connected to an end of the outdoor heat exchanger (with another end of the outdoor heat exchanger connected to an end of each indoor throttle via the outdoor throttle; and another end of each indoor throttle connected to another end of each indoor heat exchanger), a third port connected to the air-return port of the compressor, and a fourth port connected to an end of the heat-storage element (with another end of the heat-storage element connected to the end of each indoor throttle via the heat-storage throttle).

In specific, as shown in FIG. 1, the multi-split system includes an outdoor unit, at least indoor unit (such as, may be two indoor units), a heat-storage module, and a controller (not shown in drawings). The outdoor unit includes the compressor 11, the first four-way valve 13, the second four-way valve 14, the outdoor heat exchanger 15, the outdoor fan 16, the outdoor throttle 17 and the gas-liquid separator 21. The first indoor unit includes the indoor heat exchanger 35 and the indoor throttle 34. The second indoor unit includes the indoor heat exchanger 32 and the indoor throttle 31. The heat-storage module includes the heat-storage element 18 and the heat-storage throttle 19. The first four-way valve 13 is provided with the first port a13 connected to the exhaust port of the compressor 11, the second port b13 connected to an end of a gas-side cut-off valve, the third port c13 connected to an end of the gas-liquid separator 21 (with another end of the gas-liquid separator 21 connected to an air-return port of the compressor 11), and the fourth port d13 connected to a bypass capillary. The second four-way valve 14 is provided with the first port a14 connected to the exhaust port of the compressor 11, the second port b14 connected to an end of the outdoor heat exchanger 15 (with another end of the outdoor heat exchanger 15 connected to an end of the outdoor throttle 17; and another end of the outdoor throttle 17 connected to an end of a liquid-side cut-off valve), the third port c14 connected to both a first end of the gas-liquid separator 21 and the third port c13 of the first four-way valve 13, and the fourth port d14 connected to an end of the heat-storage element 18 (with another end of the heat-storage element 18 connected to an end of the heat-storage throttle 19; and another end of the heat-storage throttle 19 connected to the end of the liquid-side cut-off valve). Several indoor units are arranged in parallel between another end of the liquid-side cut-off valve and another end of the gas-side cut-off valve, and each indoor unit includes the indoor heat exchanger and the indoor throttle connected in serial. For example, a first indoor unit and a second indoor unit may be included, where the first indoor unit includes the indoor heat exchanger 35 and the indoor throttle 34 connected in serial; and the second indoor unit includes the indoor heat exchanger 32 and the indoor throttle 31 connected in serial. The controller is configured to acquire an operation mode of the multi-split system in response to determining that a shut-down instruction is received or an indoor temperature reaches to a set temperature; and control the first four-way valve 13, the second four-way valve 14, the outdoor throttle 17, the indoor throttle 34, and the heat-storage throttle 19.

It should be noted that the heat-storage element 18 is provided with a heat exchange coil, inside of which a heat-storage material is a phase-change energy-storage material, e.g., may be paraffin or a substance with a high heat-storage capacity, such as a fatty acid-like organic compound, ethylene glycol, saline, and sodium acetate solution; and that the multi-split system may be provided with sensors, for example, the exhaust pressure sensor 12 arranged at the exhaust port of the compressor 11, to acquire an exhaust pressure of the compressor 11; the air-return pressure sensor 20 arranged at the first end of the gas-liquid separator 21, to acquire an air-return pressure of the compressor 11; the outdoor ambient-temperature sensor 22 arranged outside of the outdoor heat exchanger 15, to acquire an outdoor ambient-temperature; an outdoor heat exchanger outlet temperature sensor 23 arranged at the another end of the outdoor heat exchanger 15, to acquire an outlet temperature of the outdoor heat exchanger 15; a heat-storage element temperature sensor 24 arranged in the middle of the heat-storage element 18, to acquire a temperature of the heat-storage element 18; the temperature sensor 25 arranged at the another end of the heat-storage element 18, to acquire an outlet temperature of the heat-storage element 18; the temperature sensor 36 arranged at the indoor heat exchanger 35, to acquire a pipeline temperature of the indoor heat exchanger 35; and the temperature sensor 33 arranged at the indoor heat exchanger 32, to acquire a pipeline temperature of the indoor heat exchanger 32.

Reference will be made below for illustrating the multi-split system where the first indoor unit is operating while the second indoor unit is not operating (with the indoor throttle 31 closed) as an example.

Figure 2:
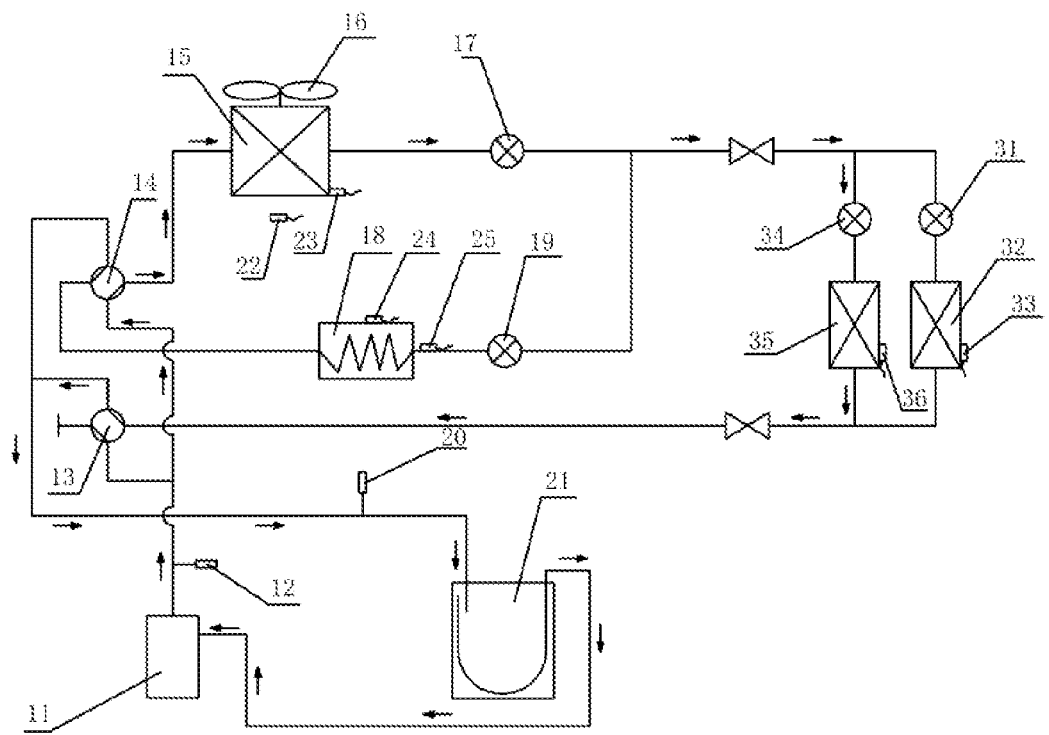
FIG. 2 is a schematic view showing a flow direction of a refrigerant in a multi-split system during operation in a normal refrigerating mode according to an embodiment of the present disclosure.

When the first indoor unit of the multi-split system is turned on to operate in a normal refrigerating mode, the controller is configured to control the first four-way valve 13 to power on, the second four-way valve 14 to power off, the outdoor throttle 17 to open, e.g., at a fixed large opening degree (such as ¾ of full opening), the indoor throttle 34 to open e.g., in accordance with target superheat (such as 1 to 5° C.), and the heat-storage throttle 19 to close. The flow direction of the refrigerant is shown in FIG. 2: the refrigerant is discharged from the exhaust port of the compressor 11→the first port a14 of the second four-way valve 14→the second port b14 of the second four-way valve 14→the outdoor heat exchanger 15→the outdoor throttle 17→the indoor throttle 34→the indoor heat exchanger 35→the second port b13 of the first four-way valve 13→the third port c13 of the first four-way valve 13→the gas-liquid separator 21→the air-return port of the compressor 11.

Figure 3:
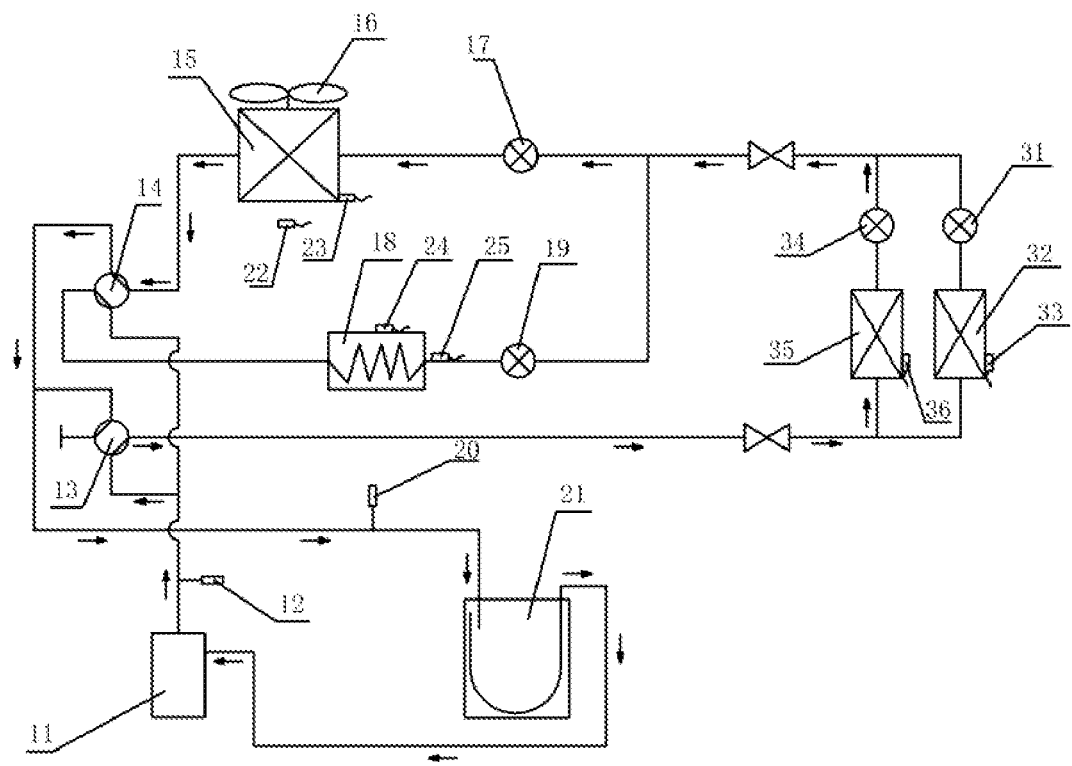
FIG. 3 is a schematic view showing a flow direction of a refrigerant in a multi-split system during operation in a normal heating mode according to an embodiment of the present disclosure.

When the first indoor unit of the multi-split system is turned on to operate in a normal heating mode, the controller is configured to control the first four-way valve 13 to power off, the second four-way valve 14 to power on, the outdoor throttle 17 to open, e.g., in accordance with target superheat (such as 1 to 5° C.), the indoor throttle 34 to open, e.g., at a fixed large opening degree (such as ¾ of full opening), and the heat-storage throttle 19 to close. The flow direction of the refrigerant is shown in FIG. 3: the refrigerant is discharged from the exhaust port of the compressor 11→the first port a13 of the first four-way valve 13→the second port b13 of the first four-way valve 13→the indoor heat exchanger 35→the indoor throttle 34→the outdoor throttle 17→the outdoor heat exchanger 15→the second port b14 of the second four-way valve 14→the third port c14 of the second four-way valve 14→the gas-liquid separator 21→the air-return port of the compressor 11.

During operation in the normal refrigerating or heating mode of the multi-split system, a user may turn off an air conditioner by accident when manipulating the air conditioner, e.g., when adjusting a temperature. If the user turns off the air conditioner by accident when manipulating the air conditioner, it will cause the compressor to shut down immediately. While because of a time interval set for restarting the multi-split system after shut-down, e.g., usually 5 min or more, especially in the case of accidental shut-down of the multi-split system during heating for a low temperature, the multi-split system will responds at a low speed, thus adversely affecting the user comfortability.

In view of the above, in embodiments of the present disclosure, the controller is configured to control the first four-way valve 13, the second four-way valve 14, the outdoor throttle 17, the indoor throttle 34, and the heat-storage throttle 19, to enable standby operation with the heat-storage module under the accidental shut-down by the user, thus facilitating the rapid response after the user corrects the fault, and improving the user comfortability.

According to an embodiment of the present disclosure, if the shut-down instruction is received during operation in the normal refrigerating mode of the multi-split system, the controller is configured to: when the shut-down instruction is received, control the first four-way valve 13 to power on, the second four-way valve 14 to power off, the outdoor throttle 17 to open, the indoor throttle 34 to close, and the heat-storage throttle 19 to open, to enable the multi-split system to operate in a first standby operation mode; determine whether a turn-on instruction is received within a first preset time period, and if the turn-on instruction is received within the first preset time period, control the first four-way valve 13 to power on, the second four-way valve 14 to power off, the outdoor throttle 17 to open, the indoor throttle 34 to open, and the heat-storage throttle 19 to close, to enable the multi-split system to continue to operate in the normal refrigerating mode; or if the turn-on instruction is not received within the first preset time period, or if the multi-split system is of an air-return superheat lower than a first preset air-return superheat, control the compressor 11 to shut down. The first preset time period and the first preset air-return superheat each may be set in accordance with an actual situation, for example, the first preset time period may be 10 s to 60 s, and the first preset air-return superheat may be 0° C. to 5° C.

Figure 4:
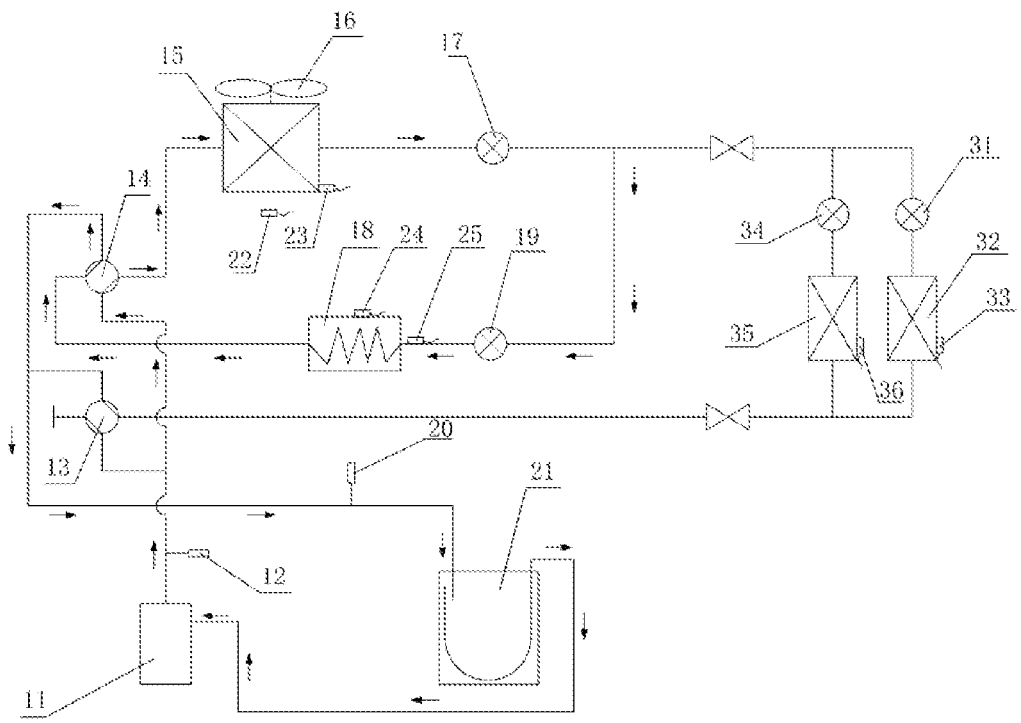
FIG. 4 is a schematic view showing a flow direction of a refrigerant in a multi-split system in a standby operation mode due to accidental shut-down and an indoor temperature reaching to a set temperature during operation in a normal refrigerating mode according to an embodiment of the present disclosure.

In specific, if the shut-down instruction is received for the first indoor unit during operation in the normal refrigerating mode of the multi-split system (with the flow direction of the refrigerant shown in FIG. 2), the controller is configured to control the first four-way valve 13 to maintain the power-on state, the second four-way valve 14 to maintain the power-off state without direction switched, the outdoor throttle 17 to maintain the open state, the indoor throttle 34 to close, and the heat-storage throttle 19 to open, to enable the multi-split system to operate in the first standby operation mode. In specific, the flow direction of the refrigerant during operation in the first standby operation mode is shown in FIG. 4: the refrigerant is discharged from the exhaust port of the compressor 11→the first port a14 of the second four-way valve 14→the second port b14 of the second four-way valve 14→the outdoor heat exchanger 15→the outdoor throttle 17→the heat-storage throttle 19→the heat-storage element 18 (for evaporation)→the fourth port d14 of the second four-way valve 14→the third port c14 of the second four-way valve 14→the gas-liquid separator 21→the air-return port of the compressor 11. In this circumstances, the compressor 11 is of an output to maintain operation at the lowest frequency, thus saving energy.

After the multi-split system is operating in the first standby operation mode, the controller is configured to: determine in real time whether the turn-on instruction is received within the first preset time period; if the turn-on instruction is received again for the indoor unit within the first preset time period, control the first four-way valve 13 to maintain the power-on state, the second four-way valve 14 to maintain the power-off state without direction switched, the outdoor throttle 17 to maintain the open state, the indoor throttle 34 to open, and the heat-storage throttle 19 to close, to enable the multi-split system to continue to operate in the normal refrigerating mode (the flow direction of the refrigerant during operation in the normal refrigerating mode is shown in FIG. 2), thus allowing for the rapid response for the indoor unit; if the turn-on instruction is not received over the first preset time period, or if the multi-split system is of the air-return superheat lower than the first preset air-return superheat, control the compressor 11 to shut down again.

Figure 4A:
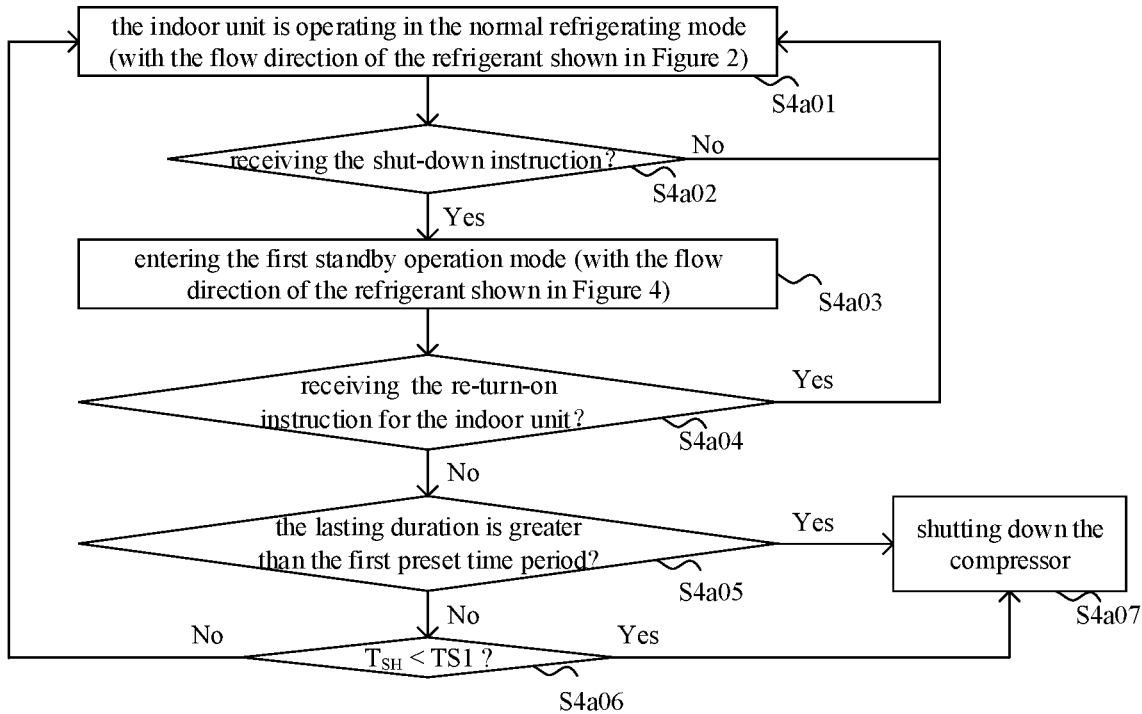
FIG. 4a is a flowchart showing a control method for a multi-split system when receiving a shut-down instruction during operation in a normal refrigerating mode according to an embodiment of the present disclosure.

In order to understand the embodiments of the present disclosure more clearly, FIG. 4a is a flowchart showing a control method for a multi-split system when receiving a shut-down instruction during operation in a normal refrigerating mode according to an embodiment of the present disclosure. As shown in FIG. 4a, the control method includes the following steps:

At S4a01, the indoor unit is operating in the normal refrigerating mode (with the flow direction of the refrigerant shown in FIG. 2);

At S4a02, determining whether the shut-down instruction is received; if yes, performing the step S4a03, if no, returning to the step S4a01;

At S4a03, entering the first standby operation mode (with the flow direction of the refrigerant shown in FIG. 4);

At S4a04, determining whether the re-turn-on instruction is received for an indoor unit; if yes, returning to perform the step S4a01, if no, performing the step S4a05;

At S4a05, determining whether the lasting duration is greater than the first preset time period, if yes, performing the step S4a07, if no, performing the step S4a06;

At S4a06, determining whether the air-return superheat $T_{SH}$ is lower than the first preset air-return superheat Ts1 (i.e., $T_{SH}<Ts1$); if yes, performing the step S4a07, if no, returning to perform the step S4a01; and At S4a07, controlling the compressor to shut down.

Accordingly, in the embodiments of the present disclosure, the multi-split system with the heat-storage module included allows for the standby operation with the heat-storage module under accidental shut-down by the user during operation in the normal refrigerating mode of the multi-split system, thus facilitating the rapid response after the user corrects the fault.

According to an embodiment of the present disclosure, if the shut-down instruction is received during operation in the normal heating mode of the multi-split system, the controller is configured to: when the shut-down instruction is received, control the first four-way valve 13 to power off, the second four-way valve 14 to power on, the outdoor throttle 17 to open, the indoor throttle 34 to open a first preset opening degree, and the heat-storage throttle 19 to open, to enable the multi-split system to operate in a second standby operation mode; determine whether the turn-on instruction is received within a second preset time period; if the turn-on instruction is received within the second preset time period, control the first four-way valve 13 to power off, the second four-way valve 14 to power on, the outdoor throttle 17 to open, the indoor throttle 34 to open, and the heat-storage throttle 19 to close, to enable the multi-split system to continue to operate in the normal heating mode; or if the turn-on instruction is not received within the second preset time period, or if the multi-split system is of an exhaust-side pressure greater than or equal to a first preset exhaust-side pressure, control the compressor 11 to shut down. The second preset time period and the first preset exhaust-side pressure each may be set in accordance with an actual situation, for example, the second preset time period may be 10 s to 60 s, and the first preset exhaust-side pressure may be 3.0 MPa to 3.5 MPa.

Figure 5:
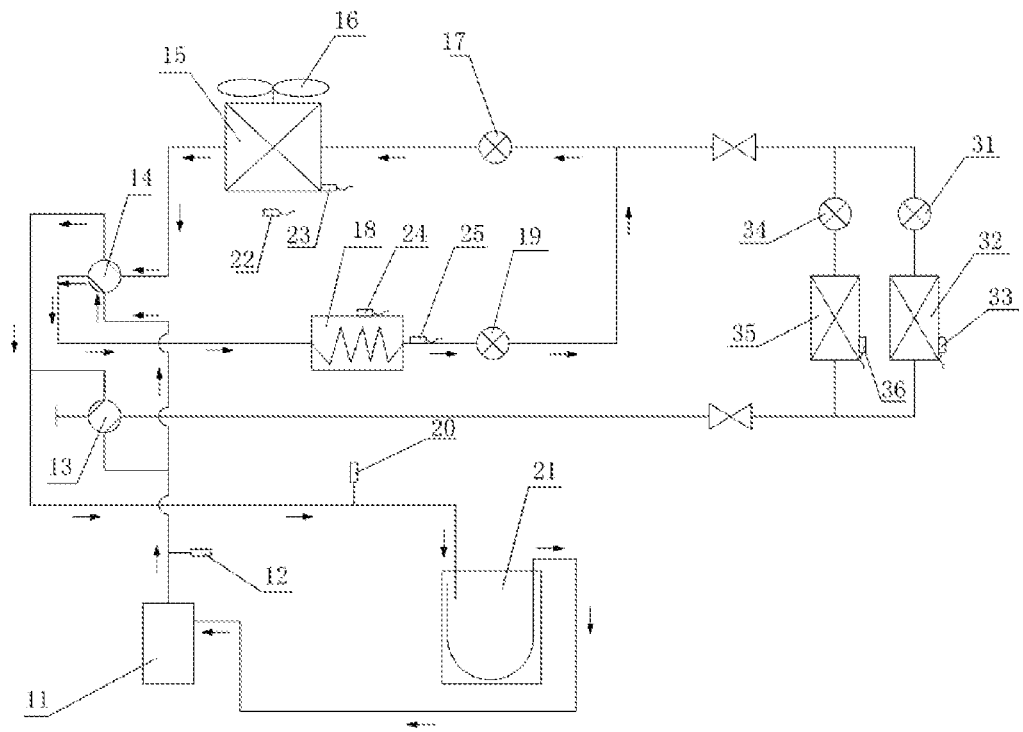
FIG. 5 is a schematic view showing a flow direction of a refrigerant in a multi-split system in a standby operation mode due to accidental shut-down and an indoor temperature reaching to a set temperature during operation in a normal heating mode according to an embodiment of the present disclosure.

In specific, if the shut-down instruction is received for the first indoor unit during operation in the normal heating mode of the multi-split system (with the flow direction of the refrigerant shown in FIG. 3), the controller is configured to control the first four-way valve 13 to maintain the power-off state without direction switched, the second four-way valve 14 to maintain the power-on state, the outdoor throttle 17 to maintain the open state, the indoor throttle 34 to open the first preset opening degree (such as 0 to ⅕ of full opening to avoid the refrigerant from accumulating in the indoor heat exchanger 35), and the heat-storage throttle 19 to open at a fixed large opening degree (such as ¾ of full opening), to enable the multi-split system to operate in the second standby operation mode. In specific, the flow direction of the refrigerant during operation in the second standby operation mode is shown in FIG. 5: the refrigerant is discharged from the exhaust port of the compressor 11→the first port a14 of the second four-way valve 14→the fourth port d14 of the second four-way valve 14→the heat-storage element 18 (for condensation of the refrigerant discharged from the compressor 11)→the heat-storage throttle 19→the outdoor throttle 17→the outdoor heat exchanger 15→the second port b14 of the second four-way valve 14→the third port c14 of the second four-way valve 14→the gas-liquid separator 21→the air-return port of the compressor 11. In this circumstances, the compressor 11 is of an output to maintain operation at the lowest frequency, thus saving energy.

After the multi-split system is operating in the second standby operation mode, the controller is configured to: determine in real time whether the turn-on instruction is received within the second preset time period; if the turn-on instruction is received again for the indoor unit within the second preset time period, control the first four-way valve 13 to maintain the power-off state, the second four-way valve 14 to maintain the power-on state, the outdoor throttle 17 to open, the indoor throttle 34 to open, and the heat-storage throttle 19 to close, to enable the multi-split system to continue to operate in the normal heating mode (the flow direction of the refrigerant during operation in the normal heating mode is shown in FIG. 3), thus allowing for the rapid response for the indoor unit; if the turn-on instruction is not received over the second preset time period, or if the multi-split system is of the exhaust-side pressure greater than or equal to the first preset exhaust-side pressure, control the compressor 11 to shut down again.

Figure 5A:
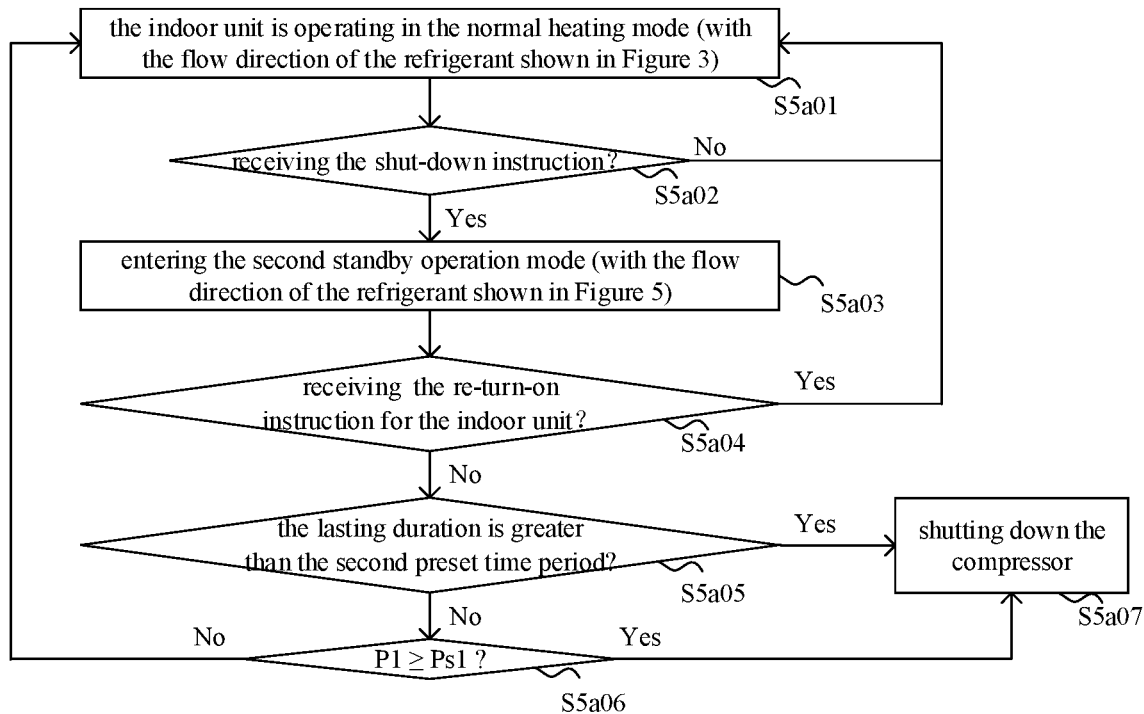
FIG. 5a is a flowchart showing a control method for a multi-split system when receiving a shut-down instruction during operation in a normal heating mode according to an embodiment of the present disclosure.

In order to understand the embodiments of the present disclosure more clearly, FIG. 5a is a flowchart showing a control method for a multi-split system when receiving a shut-down instruction during operation in a normal heating mode according to an embodiment of the present disclosure. As shown in FIG. 5a, the control method includes the following steps:

At S5a01, the indoor unit is operating in the normal heating mode (with the flow direction of the refrigerant shown in FIG. 3);

At S5a02, determining whether the shut-down instruction is received, if yes, performing the step S5a03, if no, returning to perform the step S5a01;

At S5a03, entering the second standby operation mode (with the flow direction of the refrigerant shown in FIG. 5);

At S5a04, determining whether the re-turn-on instruction is received for the indoor unit; if yes, returning to the step S5a01, if no, performing the step S5a05;

At S5a05, determining whether the lasting duration is greater than the second preset time period, if yes, performing the step S5a07, if no, performing the step S5a06;

At S5a06, determining whether the exhaust-side pressure P1 is greater than or equal to the first preset exhaust-side pressure Ps1 (i.e., P1≥Ps1), if yes, performing the step S5a07, if no returning to perform the step S5a01; and At S5a07, controlling the compressor to shut down.

Accordingly, in the embodiments of the present disclosure, the multi-split system with the heat-storage module included allows for the standby operation with the heat-storage module under accidental shut-down by the user during operation in the normal heating mode of the multi-split system, thus facilitating the rapid response after the user corrects the fault.

During operation in the normal refrigerating or heating mode of the multi-split system, it is becoming increasingly common for a compressor to shut down when an indoor temperature reaches to a set temperature with a low load at an indoor side as a result of an increasingly good insulation effect of buildings, resulting in lack of oil in the compressor for frequent shut-down in the case of the indoor temperature reaching to the set temperature, thus adversely influencing system reliability.

In view of the above, in the embodiments of the present disclosure, the controller controls the first four-way valve 13, the second four-way valve 14, the outdoor throttle 17, the indoor throttle 34, and the heat-storage throttle 19, thereby allowing for continuous operation with the heat-storage module when the indoor temperature reaches to the set temperature, thus decreasing the frequency of powering on/shutting down of the compressor, thereby improving the system reliability.

According to an embodiment of the present disclosure, if the indoor temperature reaches to the set temperature during operation in the normal refrigerating mode of the multi-split system, the controller is configured to: when the indoor temperature reaches to the set temperature, acquire a first time interval between a current time when the indoor temperature reaches to the set temperature and a previous time when the indoor temperature reached to the set temperature; and when the first time interval is less than a first preset time interval, control the first four-way valve 13 to power on, the second four-way valve 14 to power off, the outdoor throttle 17 to open, the indoor throttle 34 to close, and the heat-storage throttle 19 to open, to enable the multi-split system to operate in the first standby operation mode; or when the first time interval is greater than or equal to the first preset time interval, control the compressor 11 to shut down.

Further, the controller is further configured to: after the multi-split system is operating in the first standby operation mode, acquire an air-return superheat of the multi-split system; when the air-return superheat of the multi-split system is lower than a second preset air-return superheat, control the compressor 11 to shut down; or when the air-return superheat of the multi-split system is greater than or equal to the second preset air-return superheat, continue to acquire the first time interval between the current time when the indoor temperature reaches to the set temperature and the previous time when the indoor temperature reached to the set temperature. The second preset air-return superheat may be set in accordance with an actual situation, for example, may be 0° C. to 5° C.

Further, the controller is further configured to: after determining that the indoor temperature does not reach to the set temperature, acquire a first accumulating time period during which the multi-split system is operating in the normal refrigerating mode; and determine whether the first accumulating time period has reached to a first preset accumulating time period; if the first accumulating time period is greater than or equal to the first preset accumulating time period, control the first four-way valve 13 to power on, the second four-way valve 14 to power on, the outdoor throttle 17 to close, the indoor throttle 34 to open, and the heat-storage throttle 19 to open, thereby refrigerating with a cooling quantity accumulated in the heat-storage element 18; or if the first accumulating time period is less than the first preset accumulating time period, control the first four-way valve 13 to power on, the second four-way valve 14 to power off, the outdoor throttle 17 to open, the indoor throttle 34 to open, and the heat-storage throttle 19 to close, to enable the multi-split system to continue to operate in the normal refrigerating mode.

Still further, the controller is further configured to: after refrigerating with the cooling quantity accumulated in the heat-storage element, acquire an exhaust-side pressure of the multi-split system; and when the exhaust-side pressure of the multi-split system is greater than or equal to a second preset exhaust-side pressure, control the first four-way valve 13 to power on, the second four-way valve 14 to power off, the outdoor throttle 17 to open, the indoor throttle 34 to open, and the heat-storage throttle 19 to close, to enable the multi-split system to continue to operate in the normal refrigerating mode; or when the exhaust-side pressure of the multi-split system is lower than the second preset exhaust-side pressure, continue to control the first four-way valve 13 to power on, the second four-way valve 14 to power on, the outdoor throttle 17 to close, the indoor throttle 34 to open, and the heat-storage throttle 19 to open, thereby refrigerating with the cooling quantity accumulated in the heat-storage element. The second preset exhaust-side pressure may be set in accordance with the actual situation, for example, may be 3 3.0 MPa to 3.5 MPa.

In specific, if the indoor temperature reaches to the set temperature during operation in the normal refrigerating mode of the multi-split system (with the flow direction of the refrigerant shown in FIG. 2), the controller is configured to: record the first time interval TA from a current time when the indoor temperature reaches to the set temperature to a previous time when the indoor temperature reached to the set temperature; and if the first time interval TA is less than the first preset time interval TAS1 (usually ranging from 5 min to 10 min) (i.e., TA<TAS1), control the first four-way valve 13 to maintain the power-on state, the second four-way valve 14 to maintain the power-off state without direction switched, the outdoor throttle 17 to maintain the open state, the indoor throttle 34 to close, and the heat-storage throttle 19 to open, to enable the multi-split system to operate in the first standby operation mode (with the flow direction of the refrigerant shown in FIG. 4), i.e., the flow direction of the refrigerant is changed from FIG. 2 to FIG. 4; otherwise if the first time interval TA is greater than or equal to the first preset time interval TAS1 (i.e., TA≥TAS1), control the compressor 11 to shut down again.

After the multi-split system is operating in the first standby operation mode, the controller is configured to: acquire the air-return superheat $T_{SH}$ of the multi-split system; and when the air-return superheat $T_{SH}$ of the multi-split system is lower than the second preset air-return superheat Ts2 (i.e., $T_{SH}$<Ts2), control the compressor 11 to shut down;

when the air-return superheat $T_{SH}$ of the multi-split system is greater than or equal to the second preset air-return superheat Ts2 (i.e., $T_{SH} \geq$ Ts2), continue to record the first time interval TA from the current time when the indoor temperature reaches to the set temperature to the previous time when the indoor temperature reached to the set temperature.

Figure 6:
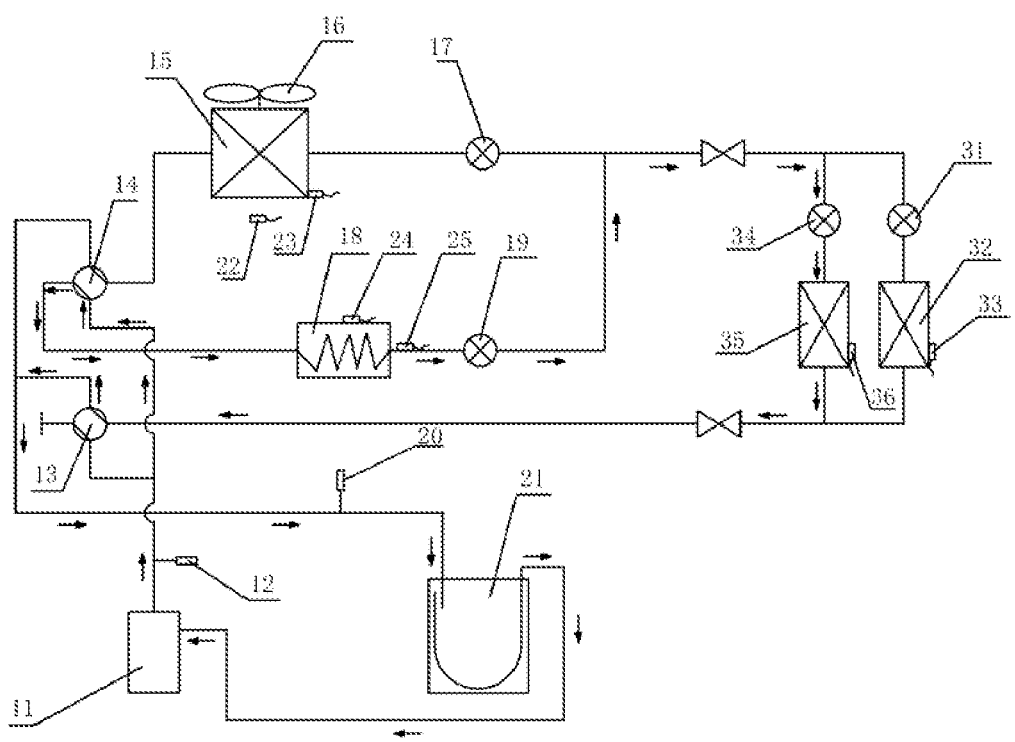
FIG. 6 is a schematic view showing a flow direction of a refrigerant for refrigerating with a cooling quantity accumulated in a heat-storage element in a multi-split system during operation in a normal refrigerating mode where an indoor unit enters the normal refrigerating mode according to an embodiment of the present disclosure.

After determining that the indoor temperature does not reach to the set temperature, the controller is configured to detect the first accumulating time period Tst during which the multi-split system is operating in the normal refrigerating mode; and continue to determine whether the first accumulating time period Tst is greater than or equal to the first preset accumulating time period ΔT1 (e.g., ranging from 5 to 20 min) (i.e., Tst≥ΔT1); if the first accumulating time period Tst is greater than or equal to the first preset accumulating time period ΔT1, determine that the heat-storage module has accumulated cooling quantity, and control the first four-way valve 13 to maintain the power-on state, the second four-way valve 14 to power on, the outdoor throttle 17 to close, the indoor throttle 34 to open in accordance with target superheat, the indoor throttle 31 to open at a fixed small opening degree (0 to ⅕ of full opening to avoid the refrigerant from accumulating in the indoor heat exchanger 33), and the heat-storage throttle 19 to open, thereby refrigerating with the cooling quantity accumulated in the heat-storage element 18, i.e., the flow direction of the refrigerant is changed from FIG. 4 to FIG. 6. The flow direction of the refrigerant as shown in FIG. 6 is: the refrigerant is discharged from the exhaust port of the compressor 11→the first port a14 of the second four-way valve 14→the fourth port d14 of the second four-way valve 14→the heat-storage element 18 (for condensation of the refrigerant discharged from the compressor 11)→the heat-storage throttle 19→the indoor throttle 34 (e.g., controlling the opening degree of the indoor throttle 34 in accordance to the target superheat 1 to 5° C.)→the indoor heat exchanger 35→the second port b13 of the first four-way valve 13→the third port c13 of the first four-way valve 13→the gas-liquid separator 21→the air-return port of the compressor 11. It should be noted that It should be noted that the first accumulating time period Tst is reset after the flow direction of the refrigerant is changed from FIG. 4 to FIG. 6; if the refrigerant does not flow as shown in FIG. 6 during the last first standby operation mode, the first accumulating time period Tst is not reset, otherwise when the first accumulating time period Tst is less than the first preset accumulating time period ΔT1 (Tst<ΔT1), the controller is configured to control the first four-way valve 13 to power on, the second four-way valve 14 to power off, the outdoor throttle 17 to open, the indoor throttle 34 to open, and the heat-storage throttle 19 to close, to enable the multi-split system to continue to operate in the normal refrigerating mode, i.e., the flow direction of the refrigerant is changed from FIG. 4 to FIG. 2.

After the flow direction of the refrigerant is changed as shown FIG. 6, the controller is configured to detect the exhaust-side pressure P1 of the multi-split system; when the exhaust-side pressure P1 of the multi-split system is greater than or equal to the second preset exhaust-side pressure Ps2 (e.g., ranging from 3.0 MPa to 3.5 MPa) (i.e., P1≥Ps2), control the first four-way valve 13 to maintain the power-on state, the second four-way valve 14 to power off, the outdoor throttle 17 to open, the indoor throttle 34 to open, and the heat-storage throttle 19 to close, to enable the multi-split system to continue to operate in the normal refrigerating mode, i.e., the flow direction of the refrigerant is changed from FIG. 6 to FIG. 2; otherwise, when the exhaust-side pressure P1 of the multi-split system is lower than the second preset exhaust-side pressure Ps2 (i.e., P1<Ps2), continue to control the first four-way valve 13 to power on, the second four-way valve 14 to power on, the outdoor throttle 17 to close, the indoor throttle 34 to open, and the heat-storage throttle 19 to open, thereby refrigerating with the cooling quantity accumulated in the heat-storage element, i.e., the multi-split system continues to operate with the refrigerant having the flow direction as shown in FIG. 6.

Figure 7:
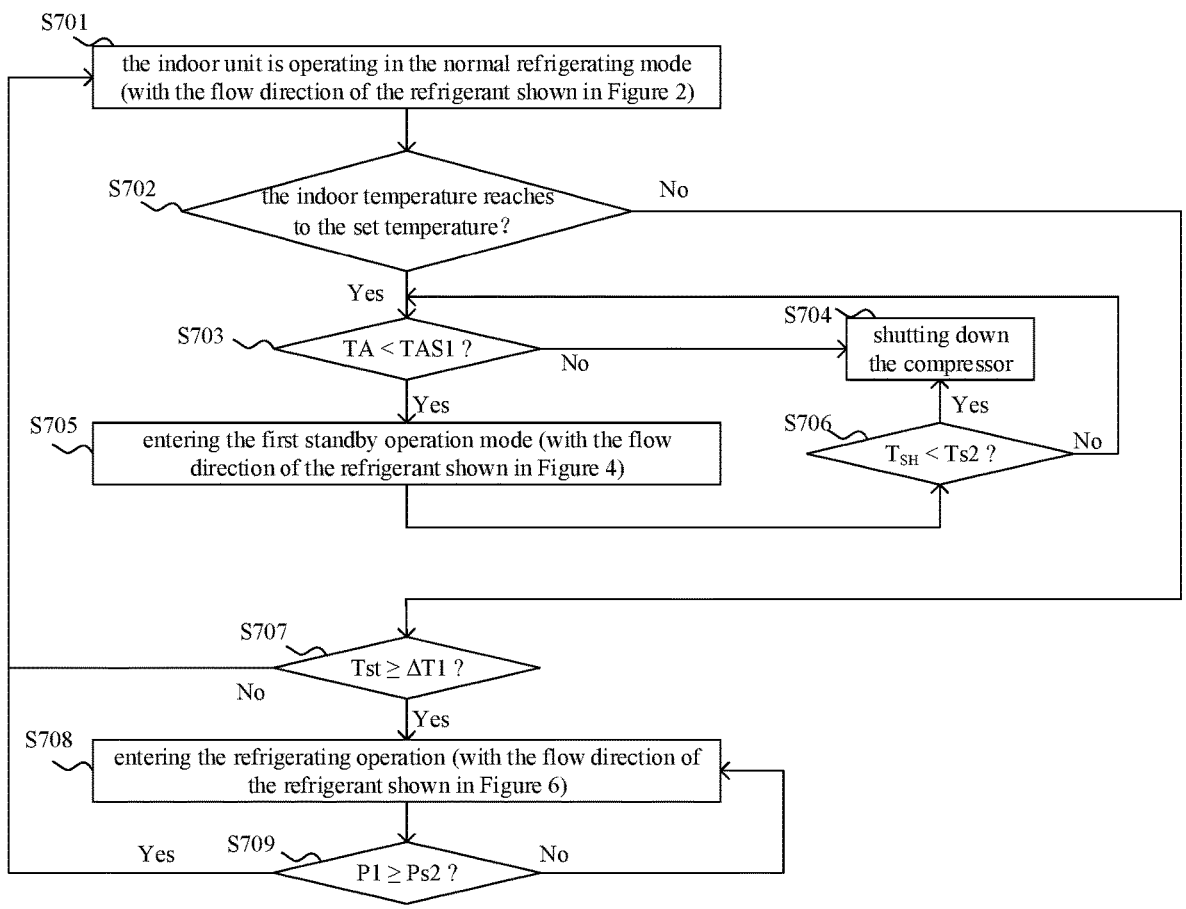
FIG. 7 is a flowchart showing a control method for a multi-split system during operation in a normal refrigerating mode where an indoor unit enters the normal refrigerating mode according to an embodiment of the present disclosure.

In order to understand the embodiments of the present disclosure more clearly, FIG. 7 is a flowchart showing a control method for a multi-split system during operation in a normal refrigerating mode where an indoor temperature reaches to a set temperature according to an embodiment of the present disclosure. As shown in FIG. 7, the control method includes the following steps:

At S701, the indoor unit is operating in the normal refrigerating mode (with the flow direction of the refrigerant shown in FIG. 2);

At S702, determining whether the indoor temperature has reached to the set temperature; if yes, performing the step S703, if no, performing the step S707;

At S703, determining whether the first time interval TA, from the current time when the indoor temperature reaches to the set temperature to the previous time when the indoor temperature reached to the set temperature, is less than the first preset time interval TAS1, if yes, performing the step S705, if no, performing the step S704;

At S704, controlling the compressor to shut down;

At S705, entering the first standby operation mode (with the flow direction of the refrigerant shown in FIG. 4);

At S706, determining whether the air-return superheat $T_{SH}$ of the multi-split system is lower than the second preset air-return superheat Ts2 (e.g., ranging from 0° C. to 5° C.) (i.e., $T_{SH}$<Ts2), if yes, performing the step S704, if no, performing the step S703;

At S707, detecting the first accumulating time period Tst during which the multi-split system is operating in the normal refrigerating mode; and determining whether the first accumulating time period Tst is greater than or equal to the first preset accumulating time period ΔT1 (e.g., ranging from 5 to 20 min) (i.e., Tst≥ΔT1), if yes, performing the step S708, if no, returning to perform the step S701;

At S708, entering the refrigerating operation (with the flow direction of the refrigerant shown in FIG. 6); and At S709, determining whether the exhaust-side pressure P1 of the multi-split system is greater than or equal to the second preset exhaust-side pressure Ps2 (e.g., ranging from 3.0 MPa to 3.5 MPa) (i.e., P1≥Ps2), if yes, returning to perform the step S701; if no, returning to perform the step S708.

Accordingly, when the indoor side is of a low load during operation in the normal refrigerating mode, the multi-split system, with the heat-storage module included serving as the condenser and the evaporator, allows for continuous operation for a sufficient time period, thus decreasing the frequency of powering on/shutting down of the compressor, thereby improving the comfortability and the system reliability.

According to an embodiment of the present disclosure, if the indoor temperature reaches to the set temperature during operation in the normal heating mode of the multi-split system, the controller is configured to: when the indoor temperature reaches to the set temperature, acquire a second time interval between a current time when the indoor temperature reaches to the set temperature and a previous time when the indoor temperature reached to the set temperature; and when the second time interval is less than a second preset time interval, control the first four-way valve 13 to power off, the second four-way valve 14 to power on, the outdoor throttle 17 to open, the indoor throttle 34 to open a first preset opening degree, and the heat-storage throttle 19 to open, to enable the multi-split system to operate in a second standby operation mode; or when the second time interval is greater than or equal to the second preset time interval, control the compressor 11 to shut down.

Further, the controller is further configured to: after the multi-split system is operating in the second standby operation mode, acquire an exhaust-side pressure of the multi-split system; when the exhaust-side pressure of the multi-split system is greater than or equal to a third preset exhaust-side pressure, control the compressor 11 to shut down; or determining that the exhaust-side pressure of the multi-split system is lower than the third exhaust-side pressure, continue to acquire the second time interval between the current time when the indoor temperature reaches to the set temperature and the previous time when the indoor temperature reached to the set temperature. The third preset exhaust-side pressure may be set in accordance with an actual situation, for example, may be 3.0 MPa to 3.5 MPa.

Further, the controller is further configured to: after determining that the indoor temperature does not reach to the set temperature, acquire a second accumulating time period during which the multi-split system is operating in the normal heating mode; and determine whether the second accumulating time period has reached to a second preset accumulating time period; if the second accumulating time period is greater than or equal to the second preset accumulating time period, control the first four-way valve 13 to power off, the second four-way valve 14 to power off, the outdoor throttle 17 to close, the indoor throttle 34 to open, and the heat-storage throttle 19 to open, thereby heating with a heat quantity accumulated in the heat-storage element 18; or if the second accumulating time period is less than the second preset accumulating time period, control the first four-way valve 13 to power off, the second four-way valve 14 to power on, the outdoor throttle 17 to open, the indoor throttle 34 to open, and the heat-storage throttle 19 to close, to enable the multi-split system to continue to operate in the normal heating mode.

Still further, the controller is further configured to: acquire an air-return superheat of the multi-split system; when the air-return superheat of the multi-split system is lower than a third preset air-return superheat, control the first four-way valve 13 to power off, the second four-way valve 14 to power on, the outdoor throttle 17 to open, the indoor throttle 34 to open, and the heat-storage throttle 19 to close, to enable the multi-split system to continue to operate in the normal heating mode; or determining that the air-return superheat of the multi-split system is greater than or equal to the third preset air-return superheat, continue to control the first four-way valve 13 to power off, the second four-way valve 14 to power off, the outdoor throttle 17 to close, the indoor throttle 34 to open, and the heat-storage throttle 19 to open, thereby heating with the heat quantity accumulated in the heat-storage element. The third preset air-return superheat may be set in accordance with an actual situation, for example, may be 0° C. to 5° C.

In specific, if the indoor temperature reaches to the set temperature during operation in the normal heating mode of the multi-split system (with the flow direction of the refrigerant shown in FIG. 3), the controller is configured to: record the second time interval TB from a current time when the indoor temperature reaches to the set temperature to a previous time when the indoor temperature reached to the set temperature; if the second time interval TB is less than the second preset time interval TBS1 (usually ranging from 5 min to 10 min) (i.e., TB<TBS1), the controller is configured to control the first four-way valve 13 to maintain the power-off state without direction switched, the second four-way valve 14 to maintain the power-on state, the outdoor throttle 17 to maintain the open state, the indoor throttle 34 to open the first preset opening degree, and the heat-storage throttle 19 to open, to enable the multi-split system to operate in the second standby operation mode (with the flow direction of the refrigerant shown in FIG. 5), i.e., the flow direction of the refrigerant is changed from FIG. 3 to FIG. 5; and if the second time interval TB is greater than or equal to the second preset time interval TBS1 (i.e., TB≥TBS1), control the compressor 11 to shut down again.

After the multi-split system is operating in the second standby operation mode, the controller is configured to acquire the exhaust-side pressure of the multi-split system; when the exhaust-side pressure $P_1$ of the multi-split system is greater than or equal to the third preset exhaust-side pressure Ps3, control the compressor 11 to shut down; or when the exhaust-side pressure $P_1$ of the multi-split system is lower than the third preset the exhaust-side pressure Ps3, continue to acquire the second time interval TB from the current time when the indoor temperature reaches to the set temperature to the previous time when the indoor temperature reached to the set temperature.

Figure 8:
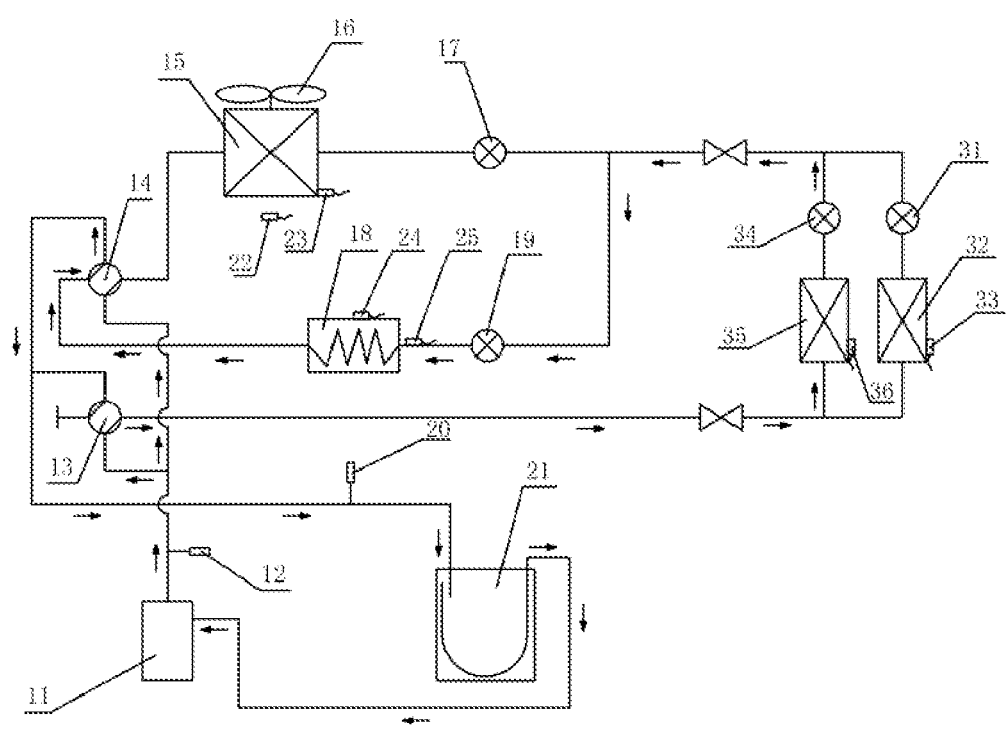
FIG. 8 is a schematic view showing a flow direction of a refrigerant for heating with a heat quantity accumulated in a heat-storage element in a multi-split system during operation in a normal heating mode where an indoor unit enters the normal heating mode according to an embodiment of the present disclosure.

After determining that the indoor temperature does not reach to the set temperature, the controller is configured to acquire the second accumulating time period Tst2 during which the multi-split system is operating in the normal heating mode; and continue to determine whether the second accumulating time period Tst2 is greater than or equal to the second preset accumulating time period ΔT2 (e.g., ranging from 5 to 20 min) (i.e., Tst2≥ΔT2), if the second accumulating time period Tst2 is greater than or equal to the second preset accumulating time period ΔT2, determine that the heat-storage module has accumulated heating quantity, and control the first four-way valve 13 to maintain the power-off state, the second four-way valve 14 to power off, the outdoor throttle 17 to close, the indoor throttle 34 to open in accordance with target superheat, the indoor throttle 31 to open at a fixed small opening degree (0 to ⅕ of full opening to avoid the refrigerant from accumulating in the indoor heat exchanger 33), and the heat-storage throttle 19 to open, thereby heating with the heat quantity accumulated in the heat-storage element 18, i.e., the flow direction of the refrigerant is changed from FIG. 5 to FIG. 8. The flow direction of the refrigerant as shown in FIG. 8 is: the refrigerant is discharged from the exhaust port of the compressor 11→the first port a13 of the first four-way valve 13→the second port b13 of the first four-way valve 13→the indoor heat exchanger 35→the indoor throttle 34 (e.g., controlling the indoor throttle 34 to open at a fixed large opening degree (such as ¾ of full opening))→the heat-storage throttle 19→the heat-storage element 18→the fourth port d14 of the second four-way valve 14→the third port c14 of the second four-way valve 14→the gas-liquid separator 21→the air-return port of the compressor 11. It should be noted that the second accumulating time period Tst2 is reset after the flow direction of the refrigerant is changed from FIG. 5 to FIG. 8; if the refrigerant does not flow as shown in FIG. 8 during the last second standby operation mode, the second accumulating time period Tst2 is not reset, otherwise when the second accumulating time period Tst2 is less than the second preset accumulating time period ΔT2 (i.e., Tst2<ΔT2), the controller is configured to control the first four-way valve 13 to power off, the second four-way valve 14 to power on, the outdoor throttle 17 to open, the indoor throttle 34 to open, and the heat-storage throttle 19 to close, to enable the multi-split system to continue to operate in the normal heating mode, i.e., the flow direction of the refrigerant is changed from FIG. 5 to FIG. 3.

After the flow direction of the refrigerant is changed as shown FIG. 8, the controller is configured to detect the air-return superheat $T_{SH}$ of the multi-split system; when the air-return superheat $T_{SH}$ of the multi-split system is lower than the third preset air-return superheat Ts3 (e.g., ranging from 0° C. to 5° C.) (i.e., $T_{SH}$<Ts3), control the first four-way valve 13 to maintain the power-off state, the second four-way valve 14 to power on, the outdoor throttle 17 to open, the indoor throttle 34 to open, and the heat-storage throttle 19 to close, to enable the multi-split system to continue to operate in the normal heating mode, i.e., the flow direction of the refrigerant is changed from FIG. 8 to FIG. 3; otherwise, when the air-return superheat $T_{SH}$ of the multi-split system is greater than or equal to the third preset air-return superheat Ts3 (i.e., $T_{SH}$≥Ts3), control the first four-way valve 13 to power off, the second four-way valve 14 to power off, the outdoor throttle 17 to close, the indoor throttle 34 to open, and the heat-storage throttle 19 to open, thereby heating with the heat quantity accumulated in the heat-storage element, i.e., the multi-split system continues to operate with the refrigerant having the flow direction as shown in FIG. 8.

It should be noted that when the refrigerant in the multi-split system flows in a direction as shown in FIG. 5, the heat-storage throttle 19 is controlled in accordance with target super-cooling.

Figure 9:
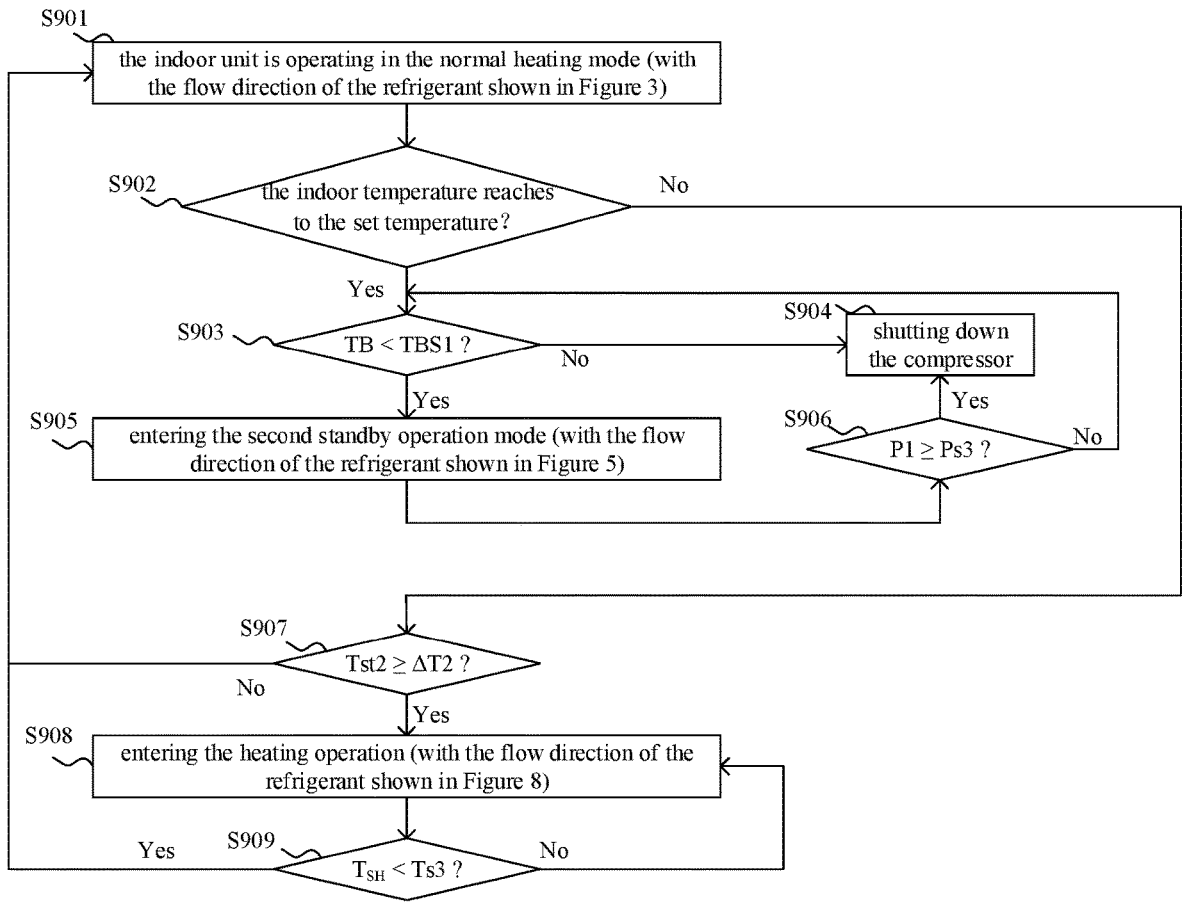
FIG. 9 is a flowchart showing a control method for a multi-split system during operation in a normal heating mode where an indoor unit enters the normal heating mode according to an embodiment of the present disclosure.

In order to understand the embodiments of the present disclosure more clearly, FIG. 9 is a flowchart showing a control method for a multi-split system during operation in a normal heating mode where an indoor temperature reaches to a set temperature according to an embodiment of the present disclosure. As shown in FIG. 9, the control method includes the following steps:

At S901, the indoor unit is operating in the normal heating mode (with the flow direction of the refrigerant shown in FIG. 3);

At S902, determining whether the indoor temperature has reached to the set temperature; if yes, performing the step S903, if no, performing the step S907;

At S903, determining whether the second time interval TB, from the current time when the indoor temperature reaches to the set temperature to the previous time when the indoor temperature reached to the set temperature, is less than the second preset time interval TBS1, if yes, performing the step S905, if no, performing the step S904;

At S904, controlling the compressor to shut down;

At S905, entering the second standby operation mode (with the flow direction of the refrigerant shown in FIG. 5);

At S906, determining whether the exhaust-side pressure P1 of the multi-split system is greater than or equal to the third preset exhaust-side pressure Ps3 (e.g., ranging from 3.0 MPa to 3.5 MPa) (i.e., P1≥Ps3), if yes, performing the step S904; if no, returning to perform the step S903;

At S907, acquiring the second accumulating time period Tst2 during which the multi-split system is operating in the normal heating mode; and determining whether the second accumulating time period Tst2 is greater than or equal to the second preset accumulating time period ΔT2 (e.g., ranging from 5 to 20 min) (i.e., Tst2≥ΔT2), if yes, performing the step S908, if no, returning to perform the step S901;

At S908, entering the heating operation (with the flow direction of the refrigerant shown in FIG. 8); and At S909, determining whether the air-return superheat $T_{SH}$ of the multi-split system is lower than the third preset air-return superheat Ts3 (e.g., ranging from 0° C. to 5° C.) (i.e., $T_{SH}$<Ts3), if yes, returning to perform the step S901, if no, returning to perform the step S908.

Accordingly, when the indoor side is of a low load during operation in the normal heating mode, the multi-split system, with the heat-storage module included serving as the condenser and the evaporator, allows for continuous operation for a sufficient time period, thus decreasing the frequency of powering on/shutting down of the compressor, thereby improving the comfortability and the system reliability.

Therefore, according to embodiments of the present disclosure, the multi-split system is composed of at least one indoor unit, the outdoor unit and the heat-storage module, where each indoor unit includes an indoor heat exchanger and an indoor throttle; the heat-storage module includes a heat-storage element and a heat-storage throttle; the outdoor unit includes a compressor, a first four-way valve, a second four-way valve, an outdoor heat exchanger, and an outdoor throttle; and the first four-way valve is provided with a first port connected to an exhaust port of the compressor, a second port connected to an end of each indoor heat exchanger, and a third port connected to an air-return port of the compressor; and the second four-way valve is provided with a first port connected to the exhaust port of the compressor, a second port connected to an end of the outdoor heat exchanger, with another end of the outdoor heat exchanger connected to an end of each indoor throttle via the outdoor throttle; and another end of each indoor throttle connected to another end of each indoor heat exchanger, a third port connected to the air-return port of the compressor, and a fourth port connected to an end of the heat-storage element, with another end of the heat-storage element connected to the end of each indoor throttle via the heat-storage throttle; and a controller, configured to: acquire the operation mode of the multi-split system, in response to determining that the shut-down instruction is received or the indoor temperature reaches to a set temperature; and control the first four-way valve, the second four-way valve, the outdoor throttle, the indoor throttle and the heat-storage throttle in accordance with the operation mode. Accordingly, the multi-split system, with the heat-storage module included, allows for the standby operation with the heat-storage module under accidental shut-down by the user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

Figure 10:
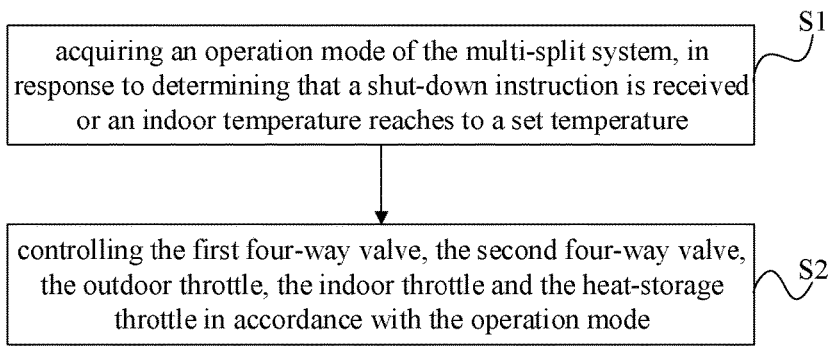
FIG. 10 is a flowchart showing a control method for a multi-split system according to an embodiment of the present disclosure.

FIG. 10 is a flowchart showing a control method for a multi-split system according to an embodiment of the present disclosure. As shown in FIG. 10, the control method for the multi-split system in an embodiment of the present disclosure includes S1 and S2.

At S1, based on that a shut-down instruction is received or an indoor temperature reaches to a set temperature, an operation mode of the multi-split system is acquired.

At S2, the first four-way valve, the second four-way valve, the outdoor throttle, the indoor throttle and the heat-storage throttle are controlled in accordance with the operation mode.

In an embodiment of the present disclosure, if the shut-down instruction is received during operation in a normal refrigerating mode of the multi-split system, controlling the first four-way valve, the second four-way valve, the outdoor throttle, the indoor throttle and the heat-storage throttle includes: if the shut-down instruction is received, controlling the first four-way valve to power on, the second four-way valve to power off, the outdoor throttle to open, the indoor throttle to close, and the heat-storage throttle to open, to enable the multi-split system to operate in a first standby operation mode; determining whether a turn-on instruction is received within a first preset time period; if the turn-on instruction is received within the first preset time period, controlling the first four-way valve to power on, the second four-way valve to power off, the outdoor throttle to open, the indoor throttle to open, and the heat-storage throttle to close, to enable the multi-split system to continue to operate in the normal refrigerating mode; or if the turn-on instruction is not received within the first preset time period, or if the multi-split system is of an air-return superheat lower than a first preset air-return superheat, controlling the compressor to shut down.

In an embodiment of the present disclosure, if the shut-down instruction is received during operation in a normal heating mode of the multi-split system, controlling the first four-way valve, the second four-way valve, the outdoor throttle, the indoor throttle and the heat-storage throttle includes: if the shut-down instruction is received, controlling the first four-way valve to power off, the second four-way valve to power on, the outdoor throttle to open, the indoor throttle to open a first preset opening degree, and the heat-storage throttle to open, to enable the multi-split system to operate in a second standby operation mode; determining whether a turn-on instruction is received within a second preset time period; if the turn-on instruction is received within the second preset time period, controlling the first four-way valve to power off, the second four-way valve to power on, the outdoor throttle to open, the indoor throttle to open, and the heat-storage throttle to close, to enable the multi-split system to continue to operate in the normal heating mode; or if the turn-on instruction is not received within the second preset time period, or if the multi-split system is of an exhaust-side pressure greater than or equal to a first preset exhaust-side pressure, controlling the compressor to shut down.

In an embodiment of the present disclosure, if the indoor temperature reaches to the set temperature during operation in a normal refrigerating mode of the multi-split system, controlling the first four-way valve, the second four-way valve, the outdoor throttle, the indoor throttle and the heat-storage throttle includes: if the indoor temperature reaches to the set temperature, acquiring a first time interval between a current time when the indoor temperature reaches to the set temperature and a previous time when the indoor temperature reached to the set temperature; when the first time interval is less than a first preset time interval, controlling the first four-way valve to power on, the second four-way valve to power off, the outdoor throttle to open, the indoor throttle to close, and the heat-storage throttle to open, to enable the multi-split system to operate in a first standby operation mode; or when the first time interval is greater than or equal to the first preset time interval, controlling the compressor to shut down.

In an embodiment of the present disclosure, after the multi-split system is operating in the first standby operation mode, the control method further includes: acquiring an air-return superheat of the multi-split system; in response to determining that the air-return superheat of the multi-split system is lower than a second preset air-return superheat, controlling the compressor to shut down; or in response to determining that the air-return superheat of the multi-split system is greater than or equal to the second preset air-return superheat, continuing to acquire the first time interval between the current time when the indoor temperature reaches to the set temperature and the previous time when the indoor temperature reached to the set temperature.

In an embodiment of the present disclosure, after determining that the indoor temperature does not reach to the set temperature, the control method further includes: acquiring a first accumulating time period during which the multi-split system is operating in the normal refrigerating mode; determining whether the first accumulating time period is greater than or equal to a first preset accumulating time period; if the first accumulating time period is greater than or equal to the first preset accumulating time period, controlling the first four-way valve to power on, the second four-way valve to power on, the outdoor throttle to close, the indoor throttle to open, and the heat-storage throttle to open, thereby refrigerating with a cooling quantity accumulated in the heat-storage element; or if the first accumulating time period is less than the first preset accumulating time period, controlling the first four-way valve to power on, the second four-way valve to power off, the outdoor throttle to open, the indoor throttle to open, and the heat-storage throttle to close, to enable the multi-split system to continue to operate in the normal refrigerating mode.

In an embodiment of the present disclosure, after refrigerating with the cooling quantity accumulated in the heat-storage element, the control method further includes: acquiring an exhaust-side pressure of the multi-split system; when the exhaust-side pressure of the multi-split system is greater than or equal to a second preset exhaust-side pressure, controlling the first four-way valve to power on, the second four-way valve to power off, the outdoor throttle to open, the indoor throttle to open, and the heat-storage throttle to close, to enable the multi-split system to continue to operate in the normal refrigerating mode; or in response to determining that the exhaust-side pressure of the multi-split system is lower than the second preset exhaust-side pressure, continuing to control the first four-way valve to power on, the second four-way valve to power on, the outdoor throttle to close, the indoor throttle to open, and the heat-storage throttle to open, thereby refrigerating with the cooling quantity accumulated in the heat-storage element.

In an embodiment of the present disclosure, if the indoor temperature reaches to the set temperature during operation in the normal heating mode of the multi-split system, controlling the first four-way valve, the second four-way valve, the outdoor throttle, the indoor throttle and the heat-storage throttle includes: if the indoor temperature reaches to the set temperature, acquiring a second time interval between a current time when the indoor temperature reaches to the set temperature and a previous time when the indoor temperature reached to the set temperature; when the second time interval is less than a second preset time interval, controlling the first four-way valve to power off, the second four-way valve to power on, the outdoor throttle to open, the indoor throttle to open a first preset opening degree, and the heat-storage throttle to open, to enable the multi-split system to operate in a second standby operation mode; or when the second time interval is greater than or equal to the second preset time interval, and controlling the compressor to shut down.

In an embodiment of the present disclosure, after the multi-split system is operating in the second standby operation mode, the control method further includes: acquiring an exhaust-side pressure of the multi-split system; in response to determining that the exhaust-side pressure of the multi-split system is greater than or equal to a third preset exhaust-side pressure, controlling the compressor to shut down; or in response to determining that the exhaust-side pressure of the multi-split system is lower than the third preset exhaust-side pressure, continuing to acquire the second time interval between the current time when the indoor temperature reaches to the set temperature and the previous time when the indoor temperature reached to the set temperature.

In an embodiment of the present disclosure, after determining that the indoor temperature does not reach to the set temperature, the control method further includes: acquiring a second accumulating time period during which the multi-split system is operated in the normal heating mode; determining whether the second accumulating time period is greater than or equal to a second preset accumulating time period; if the second accumulating time period is greater than or equal to a second preset accumulating time period, controlling the first four-way valve to power off, the second four-way valve to power off, the outdoor throttle to close, the indoor throttle to open, and the heat-storage throttle to open, thereby heating with a heat quantity accumulated in the heat-storage element; or if the second accumulating time period is less than the second preset accumulating time period, controlling the first four-way valve to power off, the second four-way valve to power on, the outdoor throttle to open, the indoor throttle to open, and the heat-storage throttle to close, to enable the multi-split system to continue to operate in the normal heating mode.

In an embodiment of the present disclosure, after heating with the heat quantity accumulated in the heat-storage element, the control method further includes: acquiring an air-return superheat of the multi-split system; when the air-return superheat of the multi-split system is lower than a third preset air-return superheat, controlling the first four-way valve to power off, the second four-way valve to power on, the outdoor throttle to open, the indoor throttle to open, and the heat-storage throttle to close, to enable the multi-split system to continue to operate in the normal heating mode; or in response to determining that the air-return superheat of the multi-split system is greater than or equal to the third preset air-return superheat, continuing to control the first four-way valve to power off, the second four-way valve to power off, the outdoor throttle to close, the indoor throttle to open, and the heat-storage throttle to open, thereby heating with the heat quantity accumulated in the heat-storage element.

It should be noted that details that are not disclosed for the control method for the multi-split system in embodiments of the present disclosure may refer to the details that has been disclosed for the multi-split system in embodiments of the present disclosure, which are not elaborated herein.

According to embodiments of the present disclosure, the control method for the multi-split system, acquires the operation mode of the multi-split system, in response to determining that the shut-down instruction is received or the indoor temperature reaches to the set temperature; and controls the first four-way valve, the second four-way valve, the outdoor throttle, the indoor throttle and the heat-storage throttle in the heat-storage module in accordance with the operation mode. Accordingly, the control method, with the heat-storage module included, allows for the standby operation with the heat-storage module under accidental shut-down by the user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

In addition, the present disclosure provides in embodiments a non-temporary computer-readable storage medium having stored therein an instruction that, when executed by a multi-split system, implements a control method for the multi-split system according to any embodiments described above.

According to embodiments of the present disclosure, the non-temporary computer-readable storage medium, by means of performing the control method for the multi-split system as described above, allows for standby operation with the heat-storage module under accidental shut-down by a user, thus facilitating the rapid response after the user corrects the fault, thereby improving the user comfortability; or allows for continuous operation with the heat-storage module when the indoor temperature reaches to the set temperature, thus decreasing the frequency of powering on/shutting down of the compressor, thereby improving the system reliability.

It should be understood that each part of the present disclosure may be realized by the hardware, software, firmware or their combination. In the above embodiments, steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the specification, it should be understood that, the terms indicating orientation or position relationship such as "central", "longitudinal", "lateral", "length", "width", "thickness", "above", "below", "front", "rear", "right", "left", "vertical", "horizontal", "top", "bottom", "inner", "outer", "clockwise", "counter-clockwise", "axial", "radial", and "circumferential" should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the feature referred to. Thus, the feature defined with "first" and "second" may include one or more this features. In the description of the present disclosure, "a plurality of" means two or more than two this features, unless specified otherwise.

In the present disclosure, unless specified or limited otherwise, the terms "mounted", "connected", "coupled", "fixed" and the like are used broadly, and may be, for example, a fixed connection, a detachable connection, or an integrated connection; may also be a mechanical or electrical connection; may also be a direct connections or indirect connection via an intervening structure; may also be an inner communication of two elements or a mutual interaction between two elements.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may be an embodiment in which the first feature is right or obliquely "on", "above" or "on top of" the second feature, or merely means that the first feature is at a height higher than that of the second feature; while a first feature "below", "under" or "on bottom of" a second feature may be an embodiment in which the first feature is right or obliquely "below", "under" or "on bottom of" the second feature, or merely means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in an embodiment", "in some embodiments", "in one embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features in different embodiments or examples as described in this specification.

What is claimed is:

1. A control method for a multi-split system,
wherein the multi-split system comprises an outdoor unit, at least one indoor unit, and a heat-storage module,
wherein the outdoor unit comprises a compressor, a first four-way valve, a second four-way valve, an outdoor heat exchanger, and an outdoor throttle;
wherein each indoor unit comprises an indoor heat exchanger and an indoor throttle;
wherein the heat-storage module comprises a heat accumulator and a heat-storage throttle,
wherein the first four-way valve is provided with
a first port connected to an exhaust port of the compressor,
a second port connected to an end of each indoor heat exchanger, and
a third port connected to an air-return port of the compressor;
wherein the second four-way valve is provided with
a first port connected to the exhaust port of the compressor,
a second port connected to an end of the outdoor heat exchanger, with another end of the outdoor heat exchanger connected to an end of each indoor throttle via the outdoor throttle; and another end of each indoor throttle connected to another end of each indoor heat exchanger,
a third port connected to the air-return port of the compressor, and
a fourth port connected to an end of the heat accumulator, with another end of the heat accumulator connected to the end of each indoor throttle via the heat-storage throttle,
wherein the control method comprises:
acquiring an operation mode of the multi-split system, in response to determining that a shut-down instruction is received or an indoor temperature reaches to a set temperature; and
controlling the first four-way valve, the second four-way valve, the outdoor throttle, the indoor throttle and the heat-storage throttle in accordance with the operation mode.

2. The control method for the multi-split system according to claim 1, wherein based on that the shut-down instruction is received during operation in a normal refrigerating mode of the multi-split system, controlling the first four-way valve, the second four-way valve, the outdoor throttle, the indoor throttle and the heat-storage throttle comprises:
controlling the first four-way valve to power on, the second four-way valve to power off, the outdoor throttle to open, the indoor throttle to close, and the heat-storage throttle to open, in response to determining that the shut-down instruction is received, to enable the multi-split system to operate in a first standby operation mode;
controlling the first four-way valve to power on, the second four-way valve to power off, the outdoor throttle to open, the indoor throttle to open, and the heat-storage throttle to close, in response to determining that a turn-on instruction is received within a first preset time period, to enable the multi-split system to continue to operate in the normal refrigerating mode; or
controlling the compressor to shut down, in response to determining that the turn-on instruction is not received within the first preset time period, or that the multi-split system is of an air-return superheat lower than a first preset air-return superheat.

3. The control method for the multi-split system according to claim 2, wherein based on that the shut-down instruction is received during operation in a normal heating mode of the multi-split system, controlling the first four-way valve, the second four-way valve, the outdoor throttle, the indoor throttle and the heat-storage throttle comprises:
controlling the first four-way valve to power off, the second four-way valve to power on, the outdoor throttle to open, the indoor throttle to open a first preset opening degree, and the heat-storage throttle to open, in response to determining that the shut-down instruction is received, to enable the multi-split system to operate in a second standby operation mode;
controlling the first four-way valve to power off, the second four-way valve to power on, the outdoor throttle to open, the indoor throttle to open, and the heat-storage throttle to close, in response to determining that a turn-on instruction is received within a second preset time period, to enable the multi-split system to continue to operate in the normal heating mode; or
controlling the compressor to shut down, in response to determining that the turn-on instruction is not received within the second preset time period, or that the multi-split system is of an exhaust-side pressure greater than or equal to a first preset exhaust-side pressure.

4. The control method for the multi-split system according to claim 2, wherein based on that the indoor temperature reaches to the set temperature during operation in a normal refrigerating mode of the multi-split system, controlling the first four-way valve, the second four-way valve, the outdoor throttle, the indoor throttle and the heat-storage throttle comprises:

acquiring a first time interval between a current time when the indoor temperature reaches to the set temperature and a previous time when the indoor temperature reached to the set temperature, in response to determining that the indoor temperature reaches to the set temperature;

controlling the first four-way valve to power on, the second four-way valve to power off, the outdoor throttle to open, the indoor throttle to close, and the heat-storage throttle to open, in response to determining that the first time interval is less than a first preset time interval, to enable the multi-split system to operate in a first standby operation mode; or controlling the compressor to shut down, in response to determining that the first time interval is greater than or equal to the first preset time interval.

5. The control method for the multi-split system according to claim 4, wherein after the multi-split system is operating in the first standby operation mode, the control method further comprises:

acquiring an air-return superheat of the multi-split system;

controlling the compressor to shut down, in response to determining that the air-return superheat of the multi-split system is lower than a second preset air-return superheat; or continuing to acquire the first time interval between the current time when the indoor temperature reaches to the set temperature and the previous time when the indoor temperature reached to the set temperature, in response to determining that the air-return superheat of the multi-split system is greater than or equal to the second preset air-return superheat.

6. The control method for the multi-split system according to claim 3, wherein after determining that the indoor temperature does not reach to the set temperature, the control method further comprises:

acquiring a first accumulating time period during which the multi-split system is operating in the normal refrigerating mode;

controlling the first four-way valve to power on, the second four-way valve to power on, the outdoor throttle to close, the indoor throttle to open, and the heat-storage throttle to open, in response to determining that the first accumulating time period is greater than or equal to a first preset accumulating time period, thereby refrigerating with a cooling quantity accumulated in the heat accumulator; or controlling the first four-way valve to power on, the second four-way valve to power off, the outdoor throttle to open, the indoor throttle to open, and the heat-storage throttle to close, in response to determining that the first accumulating time period is less than the first preset accumulating time period, to enable the multi-split system to continue to operate in the normal refrigerating mode, wherein after refrigerating with the cooling quantity accumulated in the heat accumulator, the control method further comprises:

acquiring an exhaust-side pressure of the multi-split system;

controlling the first four-way valve to power on, the second four-way valve to power off, the outdoor throttle to open, the indoor throttle to open, and the heat-storage throttle to close, in response to determining that the exhaust-side pressure of the multi-split system is greater than or equal to a second preset exhaust-side pressure, to enable the multi-split system to continue to operate in the normal refrigerating mode; or continuing to control the first four-way valve to power on, the second four-way valve to power on, the outdoor throttle to close, the indoor throttle to open, and the heat-storage throttle to open, in response to determining that the exhaust-side pressure of the multi-split system is lower than the second preset exhaust-side pressure, thereby refrigerating with the cooling quantity accumulated in the heat accumulator.

7. The control method for the multi-split system according to claim 4, wherein based on that the indoor temperature reaches to the set temperature during operation in the normal heating mode of the multi-split system, controlling the first four-way valve, the second four-way valve, the outdoor throttle, the indoor throttle and the heat-storage throttle comprises:

acquiring a second time interval between a current time when the indoor temperature reaches to the set temperature and a previous time when the indoor temperature reached to the set temperature, in response to determining that the indoor temperature reaches to the set temperature;

controlling the first four-way valve to power off, the second four-way valve to power on, the outdoor throttle to open, the indoor throttle to open a first preset opening degree, and the heat-storage throttle to open, in response to determining that the second time interval is less than a second preset time interval, to enable the multi-split system to operate in a second standby operation mode; or controlling the compressor to shut down, in response to determining that the second time interval is greater than or equal to the second preset time interval.

8. The control method for the multi-split system according to claim 7, wherein after the multi-split system is operating in the second standby operation mode, the control method further comprises:

acquiring an exhaust-side pressure of the multi-split system;

controlling the compressor to shut down, in response to determining that the exhaust-side pressure of the multi-split system is greater than or equal to a third preset exhaust-side pressure; or continuing to acquire the second time interval between the current time when the indoor temperature reaches to the set temperature and the previous time when the indoor temperature reached to the set temperature, in response to determining that the exhaust-side pressure of the multi-split system is lower than the third preset exhaust-side pressure.

9. The control method for the multi-split system according to claim 5, wherein after determining that the indoor temperature does not reach to the set temperature, the control method further comprises:

acquiring a second accumulating time period during which the multi-split system is operated in the normal heating mode;

controlling the first four-way valve to power off, the second four-way valve to power off, the outdoor throttle to close, the indoor throttle to open, and the heat-storage throttle to open, in response to determining that the second accumulating time period is greater than or equal to a second preset accumulating time period, thereby heating with a heat quantity accumulated in the heat accumulator; or controlling the first four-way valve to power off, the second four-way valve to power on, the outdoor throttle to open, the indoor throttle to open, and the heat-storage throttle to close, in response to determining that the second accumulating time period is less than the second preset accumulating time period, to enable the multi-split system to continue to operate in the normal heating mode, wherein after heating with the heat quantity accumulated in the heat accumulator, the control method further comprises:

acquiring an air-return superheat of the multi-split system;

controlling the first four-way valve to power off, the second four-way valve to power on, the outdoor throttle to open, the indoor throttle to open, and the heat-storage throttle to close, in response to determining that the air-return superheat of the multi-split system is lower than a third preset air-return superheat, to enable the multi-split system to continue to operate in the normal heating mode; or continuing to control the first four-way valve to power off, the second four-way valve to power off, the outdoor throttle to close, the indoor throttle to open, and the heat-storage throttle to open, in response to determining that the air-return superheat of the multi-split system is greater than or equal to the third preset air-return superheat, thereby heating with the heat quantity accumulated in the heat accumulator.

10. A non-temporary computer-readable storage medium having stored therein an instruction that, when executed by a multi-split system, implements a control method for the multi-split system of claim 1.

11. A multi-split system, comprising at least one indoor unit, each indoor unit comprising an indoor heat exchanger and an indoor throttle, a heat-storage module, comprising a heat accumulator and a heat-storage throttle;

an outdoor unit, comprising a compressor, a first four-way valve, a second four-way valve, an outdoor heat exchanger, and an outdoor throttle, wherein the first four-way valve is provided with a first port connected to an exhaust port of the compressor, a second port connected to an end of each indoor heat exchanger, and a third port connected to an air-return port of the compressor;

wherein the second four-way valve is provided with a first port connected to the exhaust port of the compressor, a second port connected to an end of the outdoor heat exchanger, with another end of the outdoor heat exchanger connected to an end of each indoor throttle via the outdoor throttle; and another end of each indoor throttle connected to another end of each indoor heat exchanger, a third port connected to the air-return port of the compressor, and a fourth port connected to an end of the heat accumulator, with another end of the heat accumulator connected to the end of each indoor throttle via the heat-storage throttle, a controller, configured to acquire an operation mode of the multi-split system, in response to determining that a shut-down instruction is received or an indoor temperature reaches to a set temperature; and control the first four-way valve, the second four-way valve, the outdoor throttle, the indoor throttle and the heat-storage throttle in accordance with the operation mode.

12. The multi-split system according to claim 11, wherein based on that the shut-down instruction is received during operation in a normal refrigerating mode of the multi-split system, the controller is configured to control the first four-way valve to power on, the second four-way valve to power off, the outdoor throttle to open, the indoor throttle to close, and the heat-storage throttle to open, in response to determining that the shut-down instruction is received, to enable the multi-split system to operate in a first standby operation mode;

control the first four-way valve to power on, the second four-way valve to power off, the outdoor throttle to open, the indoor throttle to open, and the heat-storage throttle to close, in response to determining that a turn-on instruction is received within a first preset time period, to enable the multi-split system to continue to operate in the normal refrigerating mode; or control the compressor to shut down, in response to determining that the turn-on instruction is not received within the first preset time period, or that the multi-split system is of an air-return superheat lower than a first preset air-return superheat.

13. The multi-split system according to claim 12, wherein based on that the shut-down instruction is received during operation in a normal heating mode of the multi-split system, the controller is configured to:

control the first four-way valve to power off, the second four-way valve to power on, the outdoor throttle to open, the indoor throttle to open a first preset opening degree, and the heat-storage throttle to open, in response to determine that the shut-down instruction is received, to enable the multi-split system to operate in a second standby operation mode;

control the first four-way valve to power off, the second four-way valve to power on, the outdoor throttle to open, the indoor throttle to open, and the heat-storage throttle to close, in response to determining that a turn-on instruction is received within a second preset time period, to enable the multi-split system to continue to operate in the normal heating mode; or control the compressor to shut down, in response to determining that the turn-on instruction is not received within the second preset time period, or that the multi-split system is of an exhaust-side pressure greater than or equal to a first preset exhaust-side pressure.

14. The multi-split system according to claim 12, wherein based on that the indoor temperature reaches to the set temperature during operation in a normal refrigerating mode of the multi-split system, the controller is configured to:

acquire a first time interval between a current time when the indoor temperature reaches to the set temperature and a previous time when the indoor temperature reached to the set temperature, in response to determining that the indoor temperature reaches to the set temperature;
control the first four-way valve to power on, the second four-way valve to power off, the outdoor throttle to open, the indoor throttle to close, and the heat-storage throttle to open, in response to determining that the first time interval is less than a first preset time interval, to enable the multi-split system to operate in the first standby operation mode; or
control the compressor to shut down, in response to determining that the first time interval is greater than or equal to the first preset time interval.

15. The multi-split system according to claim 14, wherein after the multi-split system is operating in the first standby operation mode, the controller is further configured to:
acquire an air-return superheat of the multi-split system;
control the compressor to shut down, in response to determining that the air-return superheat of the multi-split system is lower than a second preset air-return superheat; or
continue to acquire the first time interval between the current time when the indoor temperature reaches to the set temperature and the previous time when the indoor temperature reached to the set temperature, in response to determining that the air-return superheat of the multi-split system is greater than or equal to the second preset air-return superheat.

16. The multi-split system according to claim 15, wherein after determining that the indoor temperature does not reach to the set temperature, the controller is further configured to:
acquire a first accumulating time period during which the multi-split system is operating in the normal refrigerating mode;
control the first four-way valve to power on, the second four-way valve to power on, the outdoor throttle to close, the indoor throttle to open, and the heat-storage throttle to open, in response to determining that the first accumulating time period is greater than or equal to a first preset accumulating time period, thereby refrigerating with a cooling quantity accumulated in the heat accumulator; or
control the first four-way valve to power on, the second four-way valve to power off, the outdoor throttle to open, the indoor throttle to open, and the heat-storage throttle to close, in response to determining that the first accumulating time period is less than the first preset accumulating time period, to enable the multi-split system to continue to operate in the normal refrigerating mode.

17. The multi-split system according to claim 13, wherein after refrigerating with cooling quantity accumulated in the heat accumulator, the controller is further configured to:
acquire an exhaust-side pressure of the multi-split system;
control the first four-way valve to power on, the second four-way valve to power off, the outdoor throttle to open, the indoor throttle to open, and the heat-storage throttle to close, in response to determining that the exhaust-side pressure of the multi-split system is greater than or equal to a second preset exhaust-side pressure, to enable the multi-split system to continue to operate in the normal refrigerating mode; or
continue to control the first four-way valve to power on, the second four-way valve to power on, the outdoor throttle to close, the indoor throttle to open, and the heat-storage throttle to open, in response to determining that the exhaust-side pressure of the multi-split system is lower than the second preset exhaust-side pressure, thereby refrigerating with the cooling quantity accumulated in the heat accumulator.

18. The multi-split system according to claim 14, wherein based on that the indoor temperature reaches to the set temperature during operation in the normal heating mode of the multi-split system, the controller is configured to:
acquire a second time interval between a current time when the indoor temperature reaches to the set temperature and a previous time when the indoor temperature reached to the set temperature, in response to determining that the indoor temperature reaches to the set temperature;
control the first four-way valve to power off, the second four-way valve to power on, the outdoor throttle to open, the indoor throttle to open a first preset opening degree, and the heat-storage throttle to open, in response to determining that the second time interval is less than a second preset time interval, to enable the multi-split system to operate in a second standby operation mode; or
control the compressor to shut down, in response to determining that the second time interval is greater than or equal to the second preset time interval.

19. The multi-split system according to claim 18, wherein after the multi-split system is operating in the second standby operation mode, the controller is further configured to:
acquire an exhaust-side pressure of the multi-split system;
control the compressor to shut down, in response to determining that the exhaust-side pressure of the multi-split system is greater than or equal to a third preset exhaust-side pressure; or
continue to acquire the second time interval between the current time when the indoor temperature reaches to the set temperature and the previous time when the indoor temperature reached to the set temperature, in response to determining that the exhaust-side pressure of the multi-split system is lower than the third preset exhaust-side pressure.

20. The multi-split system according to claim 16, wherein after determining that the indoor temperature does not reach to the set temperature, the controller is further configured to:
acquire a second accumulating time period during which the multi-split system is operated in the normal heating mode;
control the first four-way valve to power off, the second four-way valve to power off, the outdoor throttle to close, the indoor throttle to open, and the heat-storage throttle to open, in response to determining that the second accumulating time period is greater than or equal to a second preset accumulating time period, thereby heating with a heat quantity accumulated in the heat accumulator; or
control the first four-way valve to power off, the second four-way valve to power on, the outdoor throttle to open, the indoor throttle to open, and the heat-storage throttle to close, in response to determining that the second accumulating time period is less than the second preset accumulating time period, to enable the multi-split system to continue to operate in the normal heating mode,
wherein after heating with the heat quantity accumulated in the heat accumulator, the controller is further configured to:
acquire an air-return superheat of the multi-split system;

control the first four-way valve to power off, the second four-way valve to power on, the outdoor throttle to open, the indoor throttle to open, and the heat-storage throttle to close, in response to determining that the air-return superheat of the multi-split system is lower than a third preset air-return superheat, to enable the multi-split system to continue to operate in the normal heating mode; or continue to control the first four-way valve to power off, the second four-way valve to power off, the outdoor throttle to close, the indoor throttle to open, and the heat-storage throttle to open, in response to determining that the air-return superheat of the multi-split system is greater than or equal to the third preset air-return superheat, thereby heating with the heat quantity accumulated in the heat accumulator.

* * * * *